United States Patent
Leitner et al.

(10) Patent No.: US 7,747,559 B2
(45) Date of Patent: Jun. 29, 2010

(54) SYSTEMS AND PROCESSES FOR AUTOMATED CRITERIA AND ATTRIBUTE GENERATION, SEARCHING, AUDITING AND REPORTING OF DATA

(75) Inventors: Stephen Leitner, Alpharetta, GA (US); Fred Hughes, Marietta, GA (US); Keith W. Manthey, Alpharetta, GA (US); David A. Ferber, Cumming, GA (US); John M. Dickson, Flowery Branch, GA (US); Reuben S. Kennedy, Atlanta, GA (US); Kevin M. Franklin, Marietta, GA (US); Mark Nailor, Woodstock, GA (US)

(73) Assignee: Equifax, Inc., Atlanta, GA (US)

( * ) Notice: Subject to any disclaimer, the term of this patent is extended or adjusted under 35 U.S.C. 154(b) by 1347 days.

(21) Appl. No.: 10/868,476

(22) Filed: Jun. 14, 2004

(65) Prior Publication Data

US 2005/0086579 A1    Apr. 21, 2005

Related U.S. Application Data

(60) Provisional application No. 60/478,399, filed on Jun. 13, 2003.

(51) Int. Cl.
G06F 7/00 (2006.01)
G06F 17/30 (2006.01)
G06F 17/00 (2006.01)
G06F 3/00 (2006.01)

(52) U.S. Cl. .............................. 707/102; 707/2; 707/3; 707/4; 707/5; 707/6; 707/7; 707/100; 707/104.1; 715/733; 715/762

(58) Field of Classification Search ................ 707/1–9, 707/10, 100, 102, 104.1; 705/35–39, 1; 715/733, 715/744, 762, 764, 765
See application file for complete search history.

(56) References Cited

U.S. PATENT DOCUMENTS 5,262,941 A    11/1993   Saladin et al.

(Continued)

FOREIGN PATENT DOCUMENTS

WO    WO 2004/114160    12/2004

(Continued)

OTHER PUBLICATIONS

Rezaee, Zabihollah, Sharbatoghlie, Ahmad, Elam, Rick, and McMickle, Peter L.; Auditing, V21, n1; "Continuous auditing: Building automated auditing capability"; Mar. 2002; pp. 1-18.*

(Continued)

*Primary Examiner*—Ella Colbert
(74) *Attorney, Agent, or Firm*—Kilpatrick Stockton LLP

(57) ABSTRACT

The present invention relates to methods and systems for automated criteria and attribute generation, searching, auditing and reporting of data. One aspect of an embodiment of the invention includes a method for translating a request for filtering data in a plurality of credit data sources. The method includes receiving a request based on at least one attribute and on at least one modeling criteria, wherein the at least one attribute and the at least one modeling criteria are each associated with a portion of data in a plurality of credit data sources, automatically generating executable computer code associated with the at least one attribute and at least one modeling criteria, wherein the executable computer code is adapted to filter the portion of data in the plurality of credit data sources based at least in part on the at least one attribute and at least one modeling criteria, and storing at least a portion of the executable computer code for use with another request based in part on the at least one attribute and based in part on the at least one modeling criteria.

18 Claims, 20 Drawing Sheets

U.S. PATENT DOCUMENTS

| | | | | |
|---|---|---|---|---|
| 5,404,509 | A * | 4/1995 | Klein | 707/101 |
| 5,583,760 | A * | 12/1996 | Klesse | 705/38 |
| 5,696,907 | A | 12/1997 | Tom | |
| 5,721,903 | A * | 2/1998 | Anand et al. | 707/5 |
| 5,778,357 | A | 7/1998 | Kolton et al. | |
| 5,797,133 | A | 8/1998 | Jones et al. | |
| 5,870,721 | A | 2/1999 | Norris | |
| 5,926,784 | A | 7/1999 | Richardson et al. | |
| 5,940,811 | A | 8/1999 | Norris | |
| 5,963,894 | A | 10/1999 | Richardson et al. | |
| 6,052,694 | A | 4/2000 | Bromberg | |
| 6,067,549 | A | 5/2000 | Smalley et al. | |
| 6,073,129 | A * | 6/2000 | Levine et al. | 707/4 |
| 6,088,686 | A | 7/2000 | Walker et al. | |
| 6,105,007 | A | 8/2000 | Norris | |
| 6,163,781 | A * | 12/2000 | Wess, Jr. | 707/103 X |
| 6,240,422 | B1 | 5/2001 | Atkins et al. | |
| 6,256,640 | B1 | 7/2001 | Smalley et al. | |
| 6,263,447 | B1 | 7/2001 | French et al. | |
| 6,282,658 | B2 | 8/2001 | French et al. | |
| 6,285,380 | B1 | 9/2001 | Perlin et al. | |
| 6,285,998 | B1 | 9/2001 | Black et al. | |
| 6,295,536 | B1 | 9/2001 | Sanne | |
| 6,321,206 | B1 | 11/2001 | Honarvar | |
| 6,321,339 | B1 | 11/2001 | French et al. | |
| 6,343,279 | B1 | 1/2002 | Bissonette et al. | |
| 6,356,903 | B1 | 3/2002 | Baxter et al. | |
| 6,401,098 | B1 | 6/2002 | Moulin | |
| 6,405,173 | B1 | 6/2002 | Honarvar et al. | |
| 6,415,259 | B1 | 7/2002 | Wolfinger et al. | |
| 6,415,298 | B1 | 7/2002 | Oesterer et al. | |
| 6,424,979 | B1 | 7/2002 | Livingston et al. | |
| 6,430,545 | B1 | 8/2002 | Honarvar et al. | |
| 6,430,556 | B1 | 8/2002 | Goldberg et al. | |
| 6,456,986 | B1 | 9/2002 | Boardman et al. | |
| 6,463,439 | B1 | 10/2002 | Dahlberg | |
| 6,496,936 | B1 | 12/2002 | French et al. | |
| 6,532,450 | B1 | 3/2003 | Brown et al. | |
| 6,546,545 | B1 | 4/2003 | Honarvar et al. | |
| 6,557,009 | B1 | 4/2003 | Singer et al. | |
| 6,598,067 | B1 | 7/2003 | Wydra et al. | |
| 6,601,034 | B1 | 7/2003 | Honarvar et al. | |
| 6,606,740 | B1 | 8/2003 | Lynn et al. | |
| 6,609,120 | B1 | 8/2003 | Honarvar et al. | |
| 6,611,809 | B1 | 8/2003 | McCalden | |
| 6,621,930 | B1 | 9/2003 | Smadja | |
| 6,643,625 | B1 * | 11/2003 | Acosta et al. | 705/38 |
| 6,684,192 | B2 | 1/2004 | Honarvar et al. | |
| 6,741,982 | B2 * | 5/2004 | Soderstrom et al. | 707/5 |
| 6,823,319 | B1 | 11/2004 | Lynch et al. | |
| 7,003,560 | B1 * | 2/2006 | Mullen et al. | 709/223 |
| 7,010,546 | B1 * | 3/2006 | Kolawa et al. | 707/103 R |
| 7,136,873 | B2 * | 11/2006 | Smith et al. | 707/104.1 |
| 7,181,438 | B1 * | 2/2007 | Szabo | 707/2 |
| 7,191,150 | B1 * | 3/2007 | Shao et al. | 705/38 |
| 7,380,213 | B2 * | 5/2008 | Pokorny et al. | 715/764 |
| 2002/0026443 | A1 | 2/2002 | Chang et al. | |
| 2002/0040339 | A1 | 4/2002 | Dhar et al. | |
| 2002/0069193 | A1 * | 6/2002 | Beavin et al. | 707/2 |
| 2002/0077964 | A1 | 6/2002 | Brody et al. | |
| 2002/0116244 | A1 | 8/2002 | Honarvar et al. | |
| 2002/0194120 | A1 | 12/2002 | Russell et al. | |
| 2003/0033289 | A1 | 2/2003 | Brinker et al. | |
| 2003/0110112 | A1 | 6/2003 | Johnson et al. | |
| 2003/0120529 | A1 | 6/2003 | Honarvar et al. | |
| 2003/0144950 | A1 | 7/2003 | O'Brien et al. | |
| 2003/0163414 | A1 | 8/2003 | O'Brien et al. | |
| 2003/0177079 | A1 | 9/2003 | Krajewski et al. | |
| 2003/0195828 | A1 | 10/2003 | Honarvar et al. | |
| 2003/0204426 | A1 | 10/2003 | Honarvar et al. | |
| 2004/0039687 | A1 | 2/2004 | Lent et al. | |
| 2004/0054610 | A1 | 3/2004 | Amstutz et al. | |
| 2004/0078320 | A1 | 4/2004 | DeFrancesco et al. | |
| 2004/0098359 | A1 * | 5/2004 | Bayliss et al. | 707/1 |
| 2004/0098371 | A1 | 5/2004 | Bayliss et al. | |
| 2004/0098372 | A1 | 5/2004 | Bayliss et al. | |
| 2004/0098373 | A1 | 5/2004 | Bayliss et al. | |
| 2004/0098374 | A1 | 5/2004 | Bayliss et al. | |
| 2004/0098390 | A1 | 5/2004 | Bayliss et al. | |
| 2005/0154692 | A1 | 7/2005 | Jacobsen et al. | |
| 2007/0022027 | A1 | 1/2007 | Gupta et al. | |
| 2007/0179827 | A1 | 8/2007 | Gupta et al. | |
| 2009/0044096 | A1 | 2/2009 | Gupta et al. | |
| 2009/0048999 | A1 | 2/2009 | Gupta et al. | |
| 2009/0112753 | A1 | 4/2009 | Gupta et al. | |

FOREIGN PATENT DOCUMENTS

| | | |
|---|---|---|
| WO | WO 2005/022348 | 3/2005 |
| WO | WO2005/022348 A2 | 3/2005 |
| WO | WO 2009/021011 | 2/2009 |

OTHER PUBLICATIONS

Aleskerov, E. Freisleben, B. and Rao, B.; "Cardwatch: a neural network based database mining system for credit card fraud detection"; IEEE; Mar. 24-25, 1997; p. 1.*

Business Wire; "QSpace.com Teams with the Forms Group to Offer Instant Web-Loan Decisioning to Community Banks"; Wednesday, Mar. 22, 2000; pp. 1-3.*

Friedland, Marc; "CUs move toward industry-specific scoring"; Credit Union News, v15, n16; Aug. 25, 1995; pp. 1 and 2.*

Computer Finance, v7, n8; "The Data Clean-Up Payback Calculation-Pt.-1"; Jan. 1, 1997; pp. 1-6.*

Knauf, Lynn; "Insurers look to demystify credit scoring"; National Underwriter, v105, n50; Dec. 10, 2001; pp. 1-3.*

Anonymous; ABA Bank Compliance, v17, n5; "Credit scoring primer"; May 8, 1996; pp. 1 and 2.*

Zoot Enterprises, Inc., CB Manual, Bozeman, MT (Sep. 24, 2000).

Zoot Enterprises, Inc., Untitled, Bozeman, MT (Jun. 10, 1996).

Zoot Enterprises, Inc., WebRules: Release 5.0 Enhancements, Bozeman, MT (Dec. 16, 2002).

Zoot Enterprises, Inc., Web Applications, Bozeman, MT (2004).

Zoot Enterprises, Inc., WebRules: Criteria Development Tool, Functionality Summary, Version 5.0, Bozeman, MT (2003).

Zoot Enterprises, Inc., WebRules: Zoot Criteria Development Tool, Release Notes, Version 5.0 Production Install, Bozeman, MT (Jul. 7, 2003).

Zoot Enterprises, Inc., SPOC Decision Engine, Bozeman, MT (2003).

Zoot Enterprises, Inc. CB Manual, Bozeman, MT (Sep. 24, 2000).

Seisint™ Brochure Entitled "Seisint Data Supercomputer Overview," pp. 1-7, Version 1.0, Mar. 2004.

Evans, et al., "Specifications" Online!, XP002315765 Martin Fowler Homepage http://martinfowler.com/apsupp/spec.pd, pp. 1-19 (Mar. 23, 2003).

Fowler, "Patterns of Enterprise Application Architecture," Addison Wesley and Benjamin Cummings, XP002315766, pp. 316-327 (Nov. 2002).

Han, Jiawei, et al., *Data Mining: Concepts and Techniques*, Morgan Kaufman Publishers, 340 Pine Street, 6th Floor, San Francisco, California, XP002332057, pp. 5-15, 23, 45-47, 58-61, 119-121, 453-454 (2001).

Lobel, Guido, et al., "Lexikon der Datenverarbeitung," Verlag Moderne Industrie, 8910 Landsberg, Germany, XP002332058, pp. 656-663 (1982).

Pressman, "Software Engineering: A Practitioner's Approach," McGraw Hill Publishing Company, Shoppenhangers Road, Maidenhead, Berkshire SL6 2QL, XP002315833, pp. 610-616 (1994).

Rob, Peter, et al., "Database Systems: Design, Implementation and Management, 2nd Edition," International Thomson Publishing Inc., One Corporate Place, Ferncroft Village, Danvers, Massachusetts 01923 USA, p. 125-130 (1995).

International Search Report in related Application No. PCT/US2004/019136.

International Preliminary Report on Patentability and Written Opinion for Application No. PCT/US2004/019136, dated Dec. 13, 2005.

International Search Report for Application No. PCT/US2004/028020, dated May 24, 2007.

Non-Final Office Action for U.S. Appl. No. 10/546,931, dated Aug. 28, 2008.

Non-Final Office Action for U.S. Appl. No. 10/546,931, mailed Dec. 23, 2008.

International Search Report and Written Opinion for Application No. PCT/US2008/072297, dated Mar. 30, 2009.

Amendment and Response to Non-Final Office Action for U.S. Appl. No. 10/546,931, dated May 22, 2009.

Non-Final Office Action for U.S. Appl. No. 12/257,442, mailed Jul. 2, 2009.

Amendment and Response to non-final Office Action for U.S. Appl. No. 12/257,442, filed Oct. 2, 2009.

Non-Final Office Action for U.S. Appl. No. 12/257,453, mailed Oct. 2, 2009.

Final Office Action for U.S. Appl. No. 10/546,931, mailed Oct. 1, 2009.

Non-Final Office Action, for U.S. Appl. No. 12/257,442 mailed Feb. 2, 2010.

* cited by examiner

Figure 20

| DEBT RATIO 17.1% | | | | | | | | | 2 SELECTED TRADES | | | |
|---|---|---|---|---|---|---|---|---|---|---|---|---|
| | | | | | | | | BALANCE | $00.00 | 1/29/04 | 0/0/0 | |
| | | | | | | | | CREDIT | $6.00 | RATIO | %00 | |

X ( ) ⊘ X

| EMBER | DRPT | OPND | HC | TRM | BAL | PD | CS | 30 | 60 | 90+ | PREV | DLA | MR | ECOA | ACCOUNT NUMBER |
|---|---|---|---|---|---|---|---|---|---|---|---|---|---|---|---|
| 101498 | 1/2003 | 7/2001 | 1819 | | 0 | | R1 | 0 | 0 | 0 | 3/20011221 | | 30 | I | 104305721760429 |
| ACCOUNT BALANCE | | | | | | | | | | | | | | | 2104 |
| 014980 | 1/2003 | 1/2001 | 4282 | | 0 | | R1 | 0 | 0 | 0 | 12/200221 | | 24 | I | 052814918621310 |
| CARD | | | | | | | | | | | | | | | 2106 |
| 03555 | 1/2003 | 5/2001 | 2000 | | 0 | | R1 | 0 | 0 | 0 | 6/2001 | | 20 | I | -47012548 |
| IN H/C COLUMN IS CREDIT LIMIT | | | | | | | | | | | | | | | 2108 |

*Figure 21*

HDR-POM HEADER SEGMENT

LENGTH: 230    START POS: 1
DATE: Tue Feb 25 2003    TIME: 10:10.55
PROJECT: T314208    SEQUENCE NO.: 56000554
FILE ID: 00021
FILE 2 NAME: PM.T.Y5KPT314208.CRIT.CHEK

```
CHAR     RJ        THERESA      LBULKEY       327         ARBOR
ZONE  000000000450000000000000560000000003200000340000000006400000003300000000444444
NUMR  TT00000066000000003600000000000007777700000000065000000000111220000000066660000
         01.....................................50..........................................100

CHAR     RJ        CHEYNNE      LWYB          820         W
ZONE  000000000450000000000000560000000003200000340000000006400000003300000000444444
NUMR  TT00000066000000003600000000000007777700000000065000000000111220000000066660000
       1 01.....................................50..........................................200

CHAR     .>
ZONE  000000000450000000000000560000
NUMR  TT00000066000000003600000000000
         2 01...............................30                                      2204
```

*Figure 22*

SYSTEMS AND PROCESSES FOR AUTOMATED CRITERIA AND ATTRIBUTE GENERATION, SEARCHING, AUDITING AND REPORTING OF DATA

RELATED APPLICATION

This application claims the benefit to the following portions of U.S. Provisional Application No. 60/478,399 entitled "Systems and Processes for Automated Criteria and Attribute Generation, Searching, Auditing and Reporting Data," filed on Jun. 13, 2003: Page 1-page 5, line 45; Page 6, line 3-8 (excluding FIG. 1); Page 6, line 9-Page 7, line 12; Page 7, lines 21-29; Page 8, line 1-4 (excluding FIG. 2); Page 8, lines 7-14; Page 8, lines 16-18; Page 8, line 19; Page 8, lines 23-25; Page 8, lines 26-28; Page 9, lines 1-3; Page 9, lines 4-5; Page 9, line 6; Page 9, lines 9-11; Page 9, lines 12-13; Page 9, lines 15-16; Page 9, lines 18-20; Page 9, lines 25-26; Page 9, lines 28-30; Page 9, lines 37-39; Page 9, line 40; Page 10, line 1; Page 10, lines 3-5; Page 10, lines 6-9; Page 10, lines 10-42; Page 11, lines 1-33; Page 11, lines 37-47; Pages 12-17; Page 18, lines 6-24 (excluding Figure on page 18); Page 19; Page 20, limited to the Figure on page 20; Page 22, lines 1-3; Page 22, lines 5-12; Page 22, lines 16-17; Page 22, line 21; Page 22, line 27; Pages 23-25, limited to the portions of these pages disclosed by the present application; Pages 27-28, limited to the portions of these pages disclosed by the present application; Appendix A-1; Appendix A-2; Exhibit A-3; Appendix A-4; Appendix A-5; Appendix A-6; Appendix A-7; Appendix A-8; and Appendix B, which are hereby incorporated by reference. All other portions of U.S. Provisional Application No. 60/478,399 not specifically listed above, or otherwise specifically excluded above, are not relied upon by the present application for any claim of priority.

FIELD OF THE INVENTION

The invention is generally directed to systems and methods for processing information. More particularly, the invention relates to methods and systems for automated criteria and attribute generation, searching, auditing and reporting of data.

BACKGROUND

Certain entities maintain databases which contain identification, commercial, credit and other information about many individuals and entities around the world. Among other uses of such databases, entities can request and obtain lists of certain individuals and/or entities which fit certain criteria and/or attributes, and such lists can be organized as desired for various purposes. For example, an entity for marketing purposes may desire to know information about entities who reside in Atlanta, Ga. and who are in a certain income category, and thus are potentially receptive to a certain marketing campaign. It has been possible for a third-party to specify a set of criteria and attributes to a credit reporting company, and to further specify desired formats of the responsive credit-related data to be delivered, in order to obtain such data. Conventional methods and systems can involve considerable manual effort throughout such processes, in order to interpret and program the third-party's request into an executable computer code or program which can operate on the relevant databases, test the performance of that code or program against actual or trial data in order to assure that it will provide the desired data subsets, modeling, formatting and testing of programming that creates the output results in desired form, auditing the output results, and other aspects of delivering to the third-party customer the desired output results. Manual effort performing some or all of the above tasks is time consuming and expensive.

SUMMARY OF THE INVENTION

Accordingly, systems and processes according to various aspects and embodiments according to the invention address at least some or all of these issues and combinations of them. They do so at least in part by automating criteria and attribute generation, searching, auditing, and reporting of data from credit data sources. These systems and processes can allow users to create complex filtering and analytical calculations on multiple data descriptions and sources by providing an intuitive GUI (graphical user interface) which abstracts these complexities to a higher level where a user can contend with business descriptions and relationships as opposed to programming details. These systems and processes can store a representation of a user's request in relational form that can allow the user to manage relatively large numbers of these requests in an efficient manner. In addition these systems and processes, on request by a user, can generate executable computer code, that along with a suitable runtime component can provide desired filtering calculations in a relatively high performance manner making it suitable for use on relatively large data sets or relatively high volume transaction applications. Such systems and processes are useful in fulfilling customer requests for credit data from multiple credit data sources. Systems and processes according to various aspects and embodiments can operate on various operating systems or platforms, including but not limited to, Windows NT®, UNIX®, AIX®, personal computers, mainframes, parallel processing platforms, and supercomputers.

As defined and used within this specification, an "attribute" can include a credit data-related element, a single data element from a credit file, or an aggregation, calculation, or derivation of credit data to form a new data element. Furthermore, a "criteria," also known as "modeling criteria," can include one, two, or more attributes, or a set of attributes, and a set of instructions describing a logical expression involving the attributes therein used to segment or filter credit files to obtain a desired population of data.

One aspect of systems and processes according to various embodiments of the invention, focuses on a method for translating a request for searching data in a plurality of credit data sources. The method can include receiving a request based on at least one attribute and on at least one modeling criteria, wherein the at least one attribute and the at least one modeling criteria are each associated with a portion of data in a plurality of credit data sources. The method can further include automatically generating executable computer code associated with the at least one attribute and at least one modeling criteria, wherein the executable computer code is adapted to filter the portion of data in the plurality of credit data sources based at least in part on the at least one attribute and at least one modeling criteria. Furthermore, the method can include storing at least a portion of the executable computer code for use with another request based in part on the at least one attribute and based in part on the at least one modeling criteria.

One aspect of another embodiment of the invention includes a method for testing result data obtained in response to a request for data from a plurality of credit data sources. The method can include receiving result data in response to a request for data from a plurality of credit data sources, wherein the request is based on at least one attribute and on at least one criteria associated with a portion of data from at least one of the plurality of credit data sources. The method can also include determining a model score associated with the result data, wherein the model score is based at least in part on correlation of the at least one attribute and at least one criteria with the result data. Furthermore, the method can include determining whether the result data is valid, and if the result data is not valid, receiving a change to the request. Moreover, the method can include filtering the portion of data from the plurality of credit data sources based in part on at least the change to the request to obtain modified result data in response to the change to the request.

Another aspect of an embodiment of the invention includes a method for developing executable computer code adapted to obtain a portion of data from a plurality of credit data sources in response to a request for data from a plurality of credit data sources, wherein the request is based in part on at least one attribute and based in part on at least one modeling criteria. The method can include filtering test data with an executable computer code to obtain test result data, and storing at least a portion of the executable computer code for use with another request based in part on the at least one attribute and in part on the at least one modeling criteria. The method can also include determining a model score associated with the test result data, wherein the model score is based at least in part on correlation of at least one attribute and at least one criteria with the test result data, and providing the test result data and model score to a user.

Another aspect of an embodiment of the invention includes a method for auditing result data obtained from a plurality of credit data sources in response to a request based in part on at least one attribute and based in part on at least one modeling criteria. The method can include filtering a portion of data from at least one of a plurality of credit data sources with an executable computer code to obtain test result data, and storing at least a portion of test result data. The method can also include selecting at least some of the test result data for validation of the test result data. The method can also include providing an indication of whether the test result data is based at least on the at least one attribute, and providing an indication of whether the test result data is based at least on the at least one modeling criteria.

Another aspect of an embodiment of the invention includes a method for managing a plurality of requests for filtering data in a plurality of credit data sources. The method can include receiving a plurality of requests for searching data in a plurality of credit data sources, wherein each request comprises at least one attribute and at least one modeling criteria, wherein the at least one attribute and the at least one modeling criteria are each associated with a portion of data in a plurality of credit data sources. The method can also include generating a respective executable computer code associated with each request, wherein each respective executable computer code is adapted to filter the portion of data in the plurality of credit data sources based on at least the one attribute and one modeling criteria of the respective request. Furthermore, the method can include storing each request and associated executable computer code for processing by at least one runtime component, and obtaining respective result data from the at least one runtime component from at least one of the plurality of credit data sources in response to each request.

Another aspect of an embodiment of the invention includes an automated criteria and attribute application engine that can perform some or all of the methods described above.

These example embodiments are mentioned not to limit or define the invention, but to provide examples of embodiments of the invention to aid understanding thereof. Example embodiments are discussed in the Detailed Description, and further description of the invention is provided there.

Objects, features and advantages of various systems and processes according to various embodiments of the present invention include:

(1) Providing systems and methods for a graphical user interface for automated criteria and attribute generation, searching, auditing, and reporting of data;

(2) Providing systems and methods for automatically transforming requests and models into an executable computer code or executable computer language;

(3) Providing systems and methods for automatically running test data and obtaining result data in real time;

(4) Providing systems and methods for automating system management of criteria and attributes, and providing management of files and work on projects associated with criteria and attributes;

(5) Providing systems and methods for use of same or similar functionality to allow use of similar archived projects associated with criteria and attributes;

(6) Providing systems and methods for use of automated functionality in connection with data processing for extraction of information associated with criteria and attributes;

(7) Providing systems and methods for auditing some or all result data associated with criteria and attributes;

(8) Providing systems and methods for reducing a project lifecycle from when a customer places an order for searching one or more credit data sources to the time result data is shipped to the customer;

(9) Providing systems and methods for improving programming flexibility for projects with criteria modeling and attribute selection;

(10) Providing systems and methods for improving hit rates for credit data being searched;

(11) Providing systems and methods for integrating, processing, and searching credit data from new and multiple credit data sources;

(12) Providing systems and methods for improving searching credit data based on geographical-based criteria and attributes;

(13) Providing systems and methods for obtaining a user friendly, automated, transportable system for obtaining selected credit data from one or more credit data sources;

(14) Providing systems and methods to support flexibility for changing data requirements for an automated criteria and attribute generation, searching, auditing, and reporting data system;

(15) Providing systems and methods to improve data and file quality for an automated criteria and attribute generation, searching, auditing, and reporting data system;

(16) Providing systems and methods to obtain an operationally efficient, cost effective automated criteria and attribute generation, searching, auditing, and reporting data system;

(17) Providing systems and methods to administer and select system and business rules for an automated criteria and attribute generation, searching, auditing, and reporting data system that are independent of the application code;

(18) Providing systems and methods for conducting list processing services and providing flexible output based on customer requirements for an automated criteria and attribute generation, searching, auditing, and reporting data system;

(19) Providing systems and methods for generating standardized addresses for an automated criteria and attribute generation, searching, auditing, and reporting data system;

(20) Providing systems and methods for archiving data in databases for an automated criteria and attribute generation, searching, auditing, and reporting data system; and

(21) Providing systems and methods for creating an archive of project output for an automated criteria and attribute generation, searching, auditing, and reporting data system.

Other objects, features and advantages will become apparent with respect to the remainder of this document.

BRIEF DESCRIPTION OF THE DRAWINGS

These and other features, aspects, and advantages of the present invention are better understood when the following Detailed Description is read with reference to the accompanying drawings, wherein:

FIGS. 20-22 illustrate screenshots of a user interface for auditing result data with an Audit component in accordance with an embodiment of the invention.

DETAILED DESCRIPTION

Figure 1:
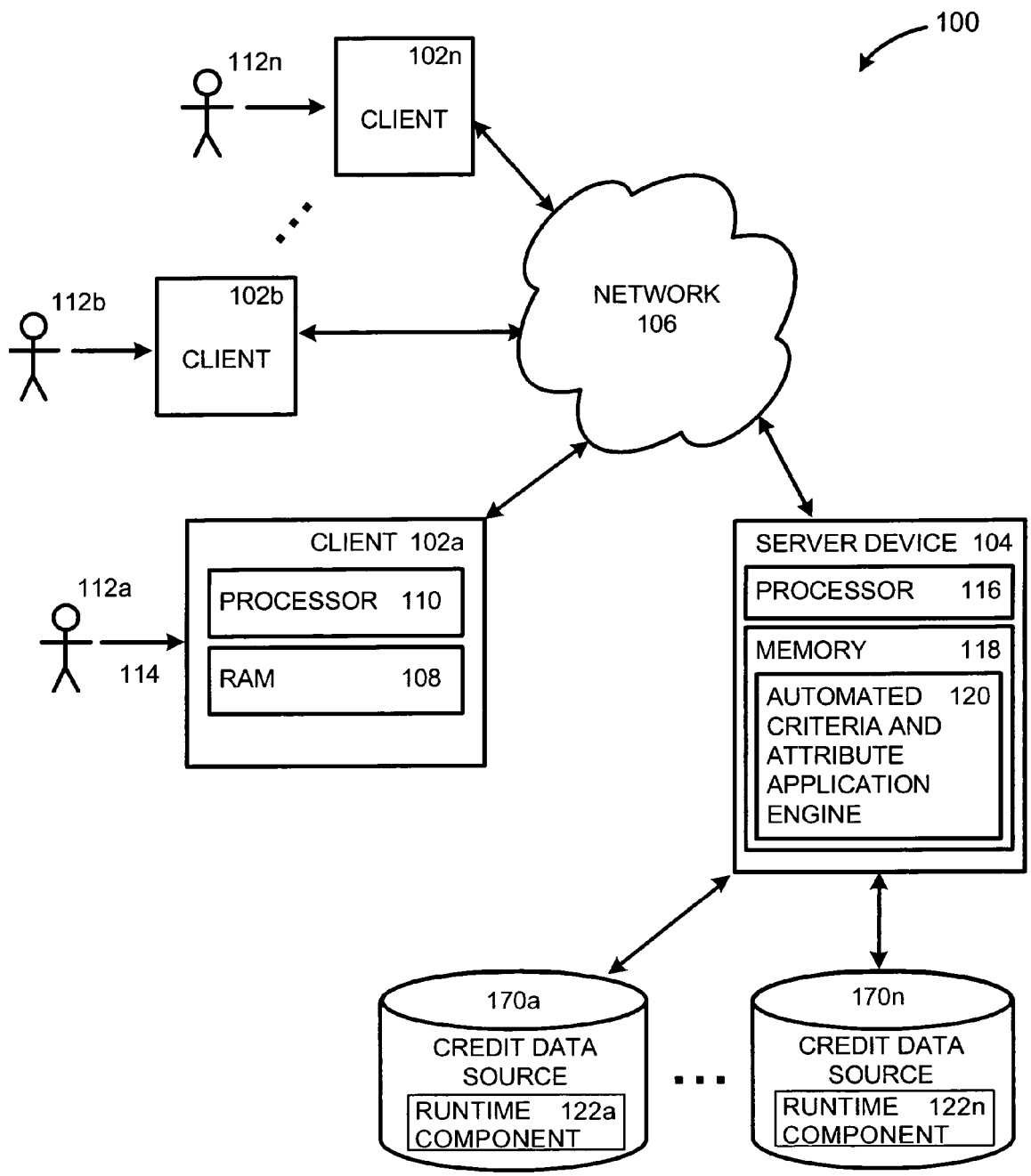
FIG. 1 is an illustration of an example of a system in accordance with an embodiment of the invention.

Referring now to the drawings in which like numerals indicate like elements throughout the several figures, FIG. 1 is an illustration of example system components for a system in accordance with an embodiment of this invention. The system 100 shown in FIG. 1 comprises multiple client devices 102a-n in communication with a server device 104 over a network 106. The network 106 shown comprises the Internet. In other embodiments, other networks, wired and wireless, such as an intranet, local area network, wide area network, or broadcast network may be used. Moreover, methods according to the present invention may operate within a single client or server device.

Each client device 102a-n shown in FIG. 1 preferably comprises a computer-readable medium. The computer-readable medium shown comprises a random access memory (RAM) 108 coupled to a processor 110. The processor 110 executes computer-executable program instructions stored in memory 108. Such processors may comprise a microprocessor, an Application-Specific Integrated Circuit (ASIC), a state machine, or other processor. Such processors comprise, or may be in communication with, media, for example computer-readable media, which stores instructions that, when executed by the processor, cause the processor to perform the steps described herein.

Embodiments of computer-readable media may comprise an electronic, optical, magnetic, or other storage or transmission device capable of providing a processor, such as the processor 110 of client 102a, with computer-readable instructions. Other examples of suitable media may comprise a floppy disk, Compact Disk Read Only Memory (CD-ROM), magnetic disk, memory chip, Read Only Memory (ROM), Random Access Memory (RAM), an ASIC, a configured processor, all optical media, all magnetic tape or other magnetic media, or any other suitable medium from which a computer processor can read instructions or on which instructions, code, or other data may be stored. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n may also comprise a number of external or internal devices such as a mouse, a CD-ROM, a keyboard, a display, or other input or output devices. Examples of client devices 102a-n are personal computers, media center computers, televisions, television set-top boxes, digital assistants, personal digital assistants, cellular phones, mobile phones, smart phones, pagers, digital tablets, laptop computers, Internet appliances, and other processor-based devices. In general, a client device 102a-n may be any type of processor-based platform that may be connected to a network 106 and that interacts with one or more application programs. Client devices 102a-n may operate on any operating system, such as Microsoft® Windows® or Linux, capable of supporting one or more client application programs. For example, the client device 102a shown comprises a personal computer executing client application programs, also known as client applications. The client applications can be contained in memory 108 and can comprise, for example, a media player application, a presentation application, an Internet browser application, a calendar/organizer application, and any other application or computer program capable of being executed by a client device.

Through the client devices 102a-n, users 112a-n can communicate over the network 106 with each other and with other systems and devices coupled to the network 106. As shown in FIG. 1, a server device 104 is also coupled to the network 106. For example in the embodiment shown in FIG. 1, a user 112a can operate a client 102a and to interact with the server device 104 and formulate a request for a particular set of credit data.

The client 102a sends a signal corresponding to the request via the network 106 to the server 104.

The server device 104 shown in FIG. 1 comprises a server executing at least one automated criteria and attribute application program, also known as the automated criteria and attribute application engine 120. Similar to the client devices 102a-n, the server device 104 shown in FIG. 1 comprises a processor 116 coupled to a computer-readable memory 118. Server device 104, depicted in FIG. 1 as a single computer system, may be implemented as a network of computer processors. Examples of a server device are servers, mainframe computers, networked computers, a processor-based device, and similar types of systems and devices. Client processors 110 and the server processor 116 can be any of a number of well known computer processors, such as processors from Intel Corporation of Santa Clara, Calif. and Motorola Corporation of Schaumburg, Ill.

Memory 118 on the server device 104 contains the automated criteria and attribute application engine 120. An automated criteria and attribute application engine 120 comprises a software or hardware application that is configured to automatically generate, search, audit criteria and attributes, provide filtering services upon credit data, and to report credit data. Examples of attributes can include, but are not limited to, first and last name, address, income, and credit score. Examples of criteria can include, but are not limited to, last names beginning with "C," addresses in the 30308 zip code, income above $250,000, and credit scores above 720. An associated runtime component 122a-n associated with each respective credit data source 170a-n can utilize executable computer code to filter or otherwise locate relevant credit data in one or more credit data sources 170a-n. In response to a request from a user 112a-n, the automated criteria and attribute application engine 120 shown in FIG. 1 can generate filtering capabilities as executable computer code that can operate on relevant information, such as credit data, in one or more credit data sources 170a-n, such as a credit reporting database containing a suitable run-time component or runtime environment component. In one embodiment, the automated criteria and attribute application engine 120 can generate executable computer code. The automated criteria and attribute application engine 120 can transmit the executable computer code to at least one credit data source such as credit data source 170a. An associated runtime component 122a associated with the credit data source 170a can utilize the executable computer code to locate relevant information, such as credit data, in the data source 170a.

Although the processes described herein are described in relation to the client and server or servers, a client may perform any or all of the processes described as being performed by a server. Similarly, a server or servers may perform any or all of the processes described herein as being performed by a client, although the invention is not limited to client/server architecture but can run on any desired topology or architecture as deemed fit for the purposes, whether existing as of the time of the writing of this document or thereafter.

Figure 2:
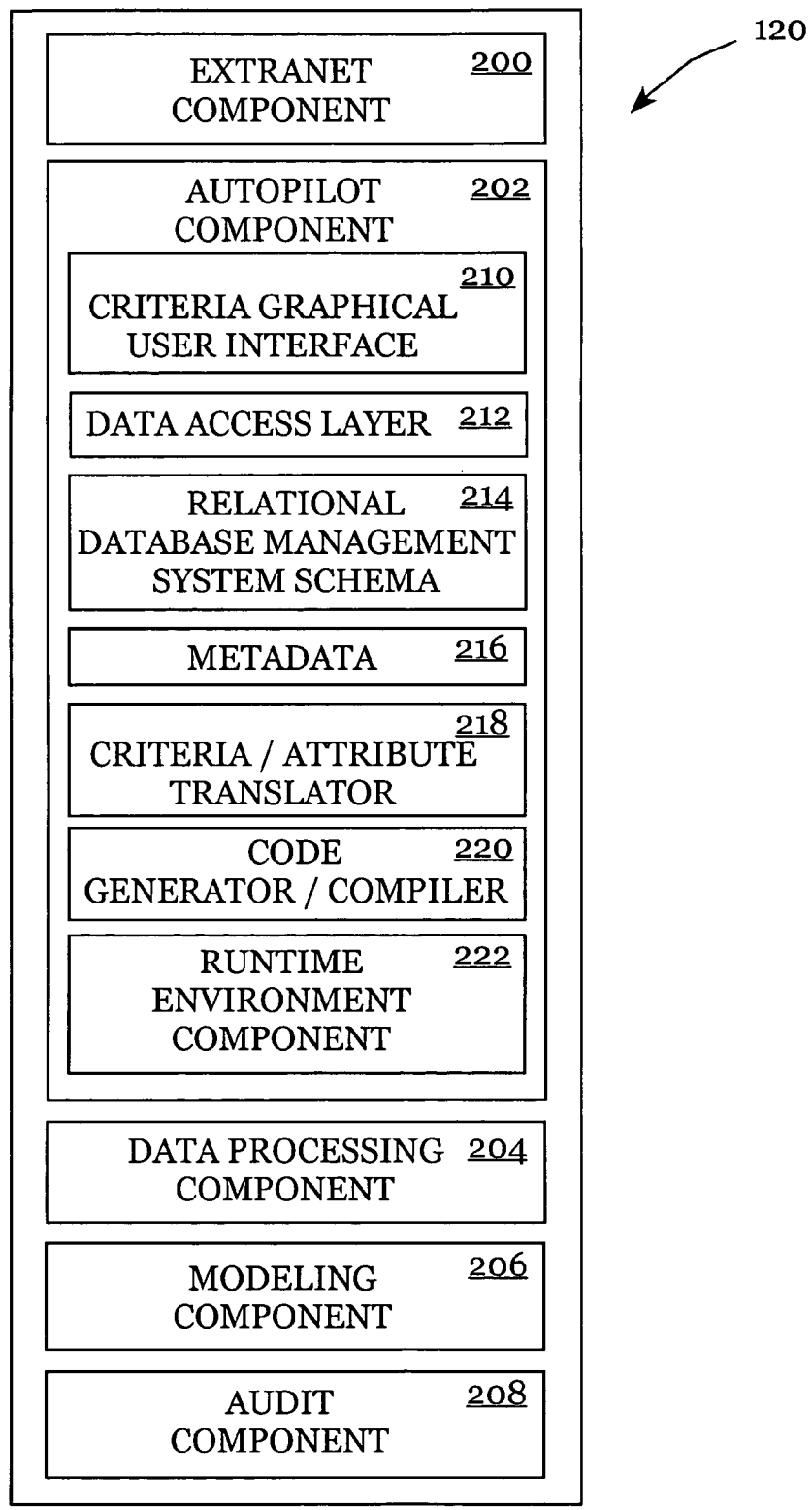
FIG. 2 is an illustration of certain components for an automated criteria and attribute application engine for a system in accordance with an embodiment of the invention.

Embodiments of the present invention can comprise systems having different architecture than that which is shown in FIG. 1. For example, in some systems according to the present invention, server device 104 may comprise a single physical or logical server. The system 100 shown in FIG. 1 is merely an example, and is used as an environment to help explain the example processes and methods shown in FIGS. 3A-3D, 15-19, and 23. As shown in FIG. 2, an example automated criteria and attribute application engine 120 can include, but is not limited to, an Extranet component 200, an Autopilot component 202, a data processing component 204, a Modeling component 206, and an Audit component 208. Other components, modules, or sub-components for an automated criteria and attribute application engine 120 can exist. Collectively, the components of the automated criteria and attribute application engine 120 can process credit data at an intuitive and relatively higher analytic level than prior conventional systems and processes, as users 112a-n can focus more on credit data being sought and how it will be presented, and less about instantiating the request for credit data into a code or executable computer language for processing. The development, specification, selection, generation, and application of attributes and criteria associated with credit data are central to credit-granting entities of the United States and other countries, and the automated criteria and attribute application engine 120 improves attribute and criteria management.

In the embodiment shown in FIG. 2, the Extranet component 200 can provide a user interface for use of the automated criteria and attribute application engine 120 by users 112a-n, such as a customer, via the network 106. The Extranet component 200 provides users 112a-n with on-line accessibility and usability of credit reporting data, and on-line functionality of the various other components 202, 204, 206, 208 of the automated criteria and attribute application engine 120.

The Extranet component 200 can provide a user interface for a user 112a-n, such as a customer, to interact with the automated criteria and attribute application engine 120. Depending on the interaction with the user 112a-n, the Extranet component 200 can transmit signals to various other components of the automated criteria and attribute application engine 120 for processing. For example, the Extranet component 200 can provide a presentation layer of functionality to users 112a-n, and can transmit requests for credit data to the data processing component 204, and Autopilot component 202. Through the user interface, the Extranet component 200 can provide project and status information, such as credit files, industry trends, and other credit or industry-related information, to users 112a-n. The Extranet component 200 can also provide to users 112a-n information associated with new and/or customized product offerings for particular groups of customers. Product offerings can include, but are not limited to, quick counts and "what if" scenarios, and customer-oriented benefit programs. To reduce any redundancy of functions or activities across the various other components of the automated criteria and attribute application engine 120, the Extranet component 200 can coordinate its activities through the data processing component 204, and Autopilot component 202 described in greater detail below.

In the embodiment shown in FIG. 2, an Autopilot component 202 can include sub-components such as a criteria graphical user interface 210, a data access layer 212, a relational database management system (RDBMS) schema 214, metadata 216, a criteria/attribute translator 218, a code generator/compiler 220, and a runtime component 222.

In the embodiment shown in FIG. 2, a criteria graphical user interface 210 can be a user interface that supplies "drag and drop," "point and click" or other friendly-type functionality to a user 112a-n for designing criteria and attributes.

In the embodiment shown in FIG. 2, a data access layer 212 can be an internal component that can process communications, such as messages, to and from the criteria graphical user interface 210. The data access layer can also extract and populate data received via the interface 210 into an associated memory 118, database or data storage device.

In the embodiment shown in FIG. 2, the relational database management system (RDBMS) schema 214 can be a local database or other data storage device that can support the definition and management of criteria and attributes. The relational database management system schema 214 can also provide and store respective definitions and associated descriptions of the particular types of data that can be processed by or otherwise operated on by the Autopilot component 202 or the automated criteria and attribute application engine 120.

In the embodiment shown in FIG. 2, metadata 216 can be a database or data storage device that can be populated at a particular time, such as the installation time, with various basic system definitions for data to be processed by the Autopilot component 202 or the automated criteria and attribute application engine 120. Basic system definitions can describe the various data and format of such data that the Autopilot component 202 or the automated criteria and attribute application engine 120 can process or otherwise operate on. Basic system definitions can include, but are not limited to, financial and credit related definitions, ease of use definitions of data, help files, and basic project organization data.

In the embodiment shown in FIG. 2, a criteria/attribute translator 218 can read a file from an associated memory 118, database, or data storage device, such as an associated database project file, and can translate such files including any associated relational information into respective descriptor records on each pertinent element of the request. For example, elements of a request can include attributes, criteria, input and output descriptions, and sequential processing directions regarding modeling criteria decisioning.

In the embodiment shown in FIG. 2, a code generator/compiler 220 can handle and process translator descriptor records. For example, translator descriptor records can be used as an input to a code generation process that can produce a procedural computer language source file. The procedural computer language source file can then be compiled and linked with a suitable runtime component, such as 122a-n, for a desired target environment selected by the user 112a-n.

In the embodiment shown in FIG. 2, a runtime environment component 222 can be a component associated with a particular operating platform and/or processing type, including but not limited to, batch, online transaction, and remote object call. The runtime environment component 222 can be similar to the run-time components 122a-n shown in FIG. 1.

FIGS. 3A-3D are illustrations of example process flow environments for systems and methods in accordance with an embodiment of the invention. In the embodiment shown in FIGS. 3A-3D, respective process flow environments for each component are illustrated such as the Autopilot component 202, data processing component 204, Modeling component 206, and Audit component 208. Other process flow environments can operate in conjunction with the components 200, 202, 204, 206, 208 shown.

Autopilot Component and Processes

Figure 3A:
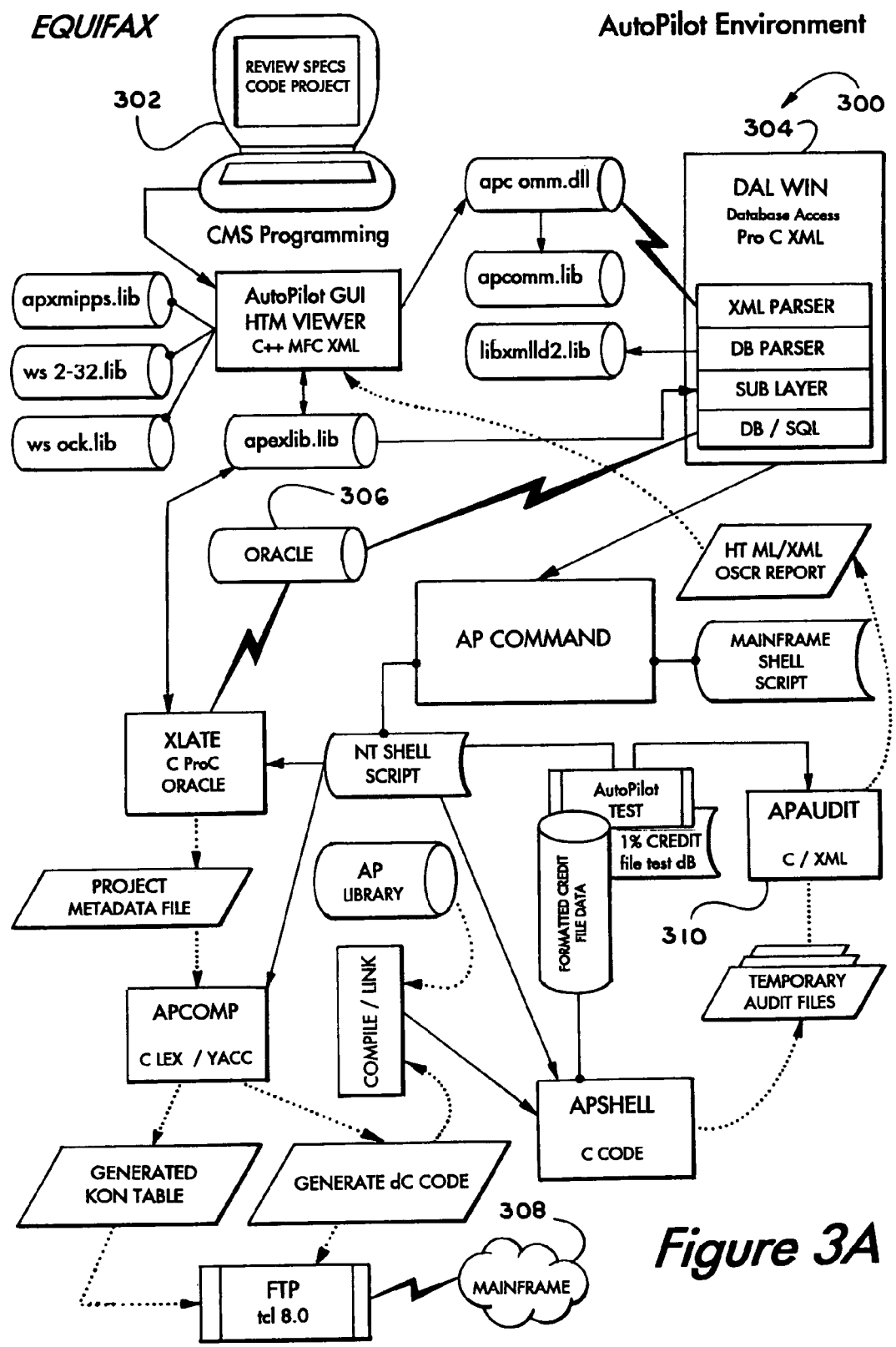
FIG. 3A illustrates an example of a process flow for an Autopilot component in accordance with an embodiment of the invention.

FIG. 3A is an illustration of an example process flow environment 300 for an Autopilot component 202 in accordance with an embodiment of the invention. In the embodiment shown in FIG. 3A, the Autopilot component 202 can provide a customer-facing, "front end" graphical user interface for the selection of criteria and attributes, and the automatic generation of a corresponding executable computer code for processing criteria and attributes. The environment 300 shown in FIG. 3A includes a user interface 302, a server 304, a database 306, a data processing interface 308, and an Audit interface 310. Through the various interfaces, the Autopilot component 202 can interact with other components as needed to send and to receive project-related data, messages, and signals for coordination of the features with other components' features.

The Autopilot component 202 can provide a user interface 302 such as a Windows® application or other type of graphical user interface that permits users 112a-n such as customers or business analysts to create, manipulate, and test results of attributes and modeling criteria for credit data at a "business level." That is, users 112a-n can define desired attributes and modeling criteria in a "business-type" language rather than "assembly-type" or $3^{rd}$ generation procedural programming language. For example, the Autopilot component 202 can provide a "point and click" and a "drag and drop" graphical user interface that permits a user 112a-n to make relatively quick selections of criteria and attributes for a project. Selected criteria and attributes in a request can be formulated via the interaction between the user interface 302 and the server 304, and can be submitted for subsequent processing. By way of further example, frequently used selections by a particular user 112a can be automatically highlighted on the user interface 302 for the user 112a to select. The server 304 can receive the criteria and attributes in the form of a request for processing. A "request" is a request for a particular set of data from one or more credit data sources 170a-n wherein the data is associated with at least one criteria or one attribute, or a combination thereof. Requests which can be processed by the Autopilot component 202 shown can include, but are not limited to, (1) a new criteria, (2) a "similar to" criteria, (3) a new "little criteria record—attributes," or "LCR—Attributes" (a holding area for information, which typically contains the attributes that being purchased by the customer), and (4) a "similar to" LCR. Requests can be serviced when the Autopilot component 202 generates executable computer code that can be processed via a suitable run-time component, such as run-time component 122a-n, or a similar type of component operating on a processing platform such as server device 104.

Figure 4:
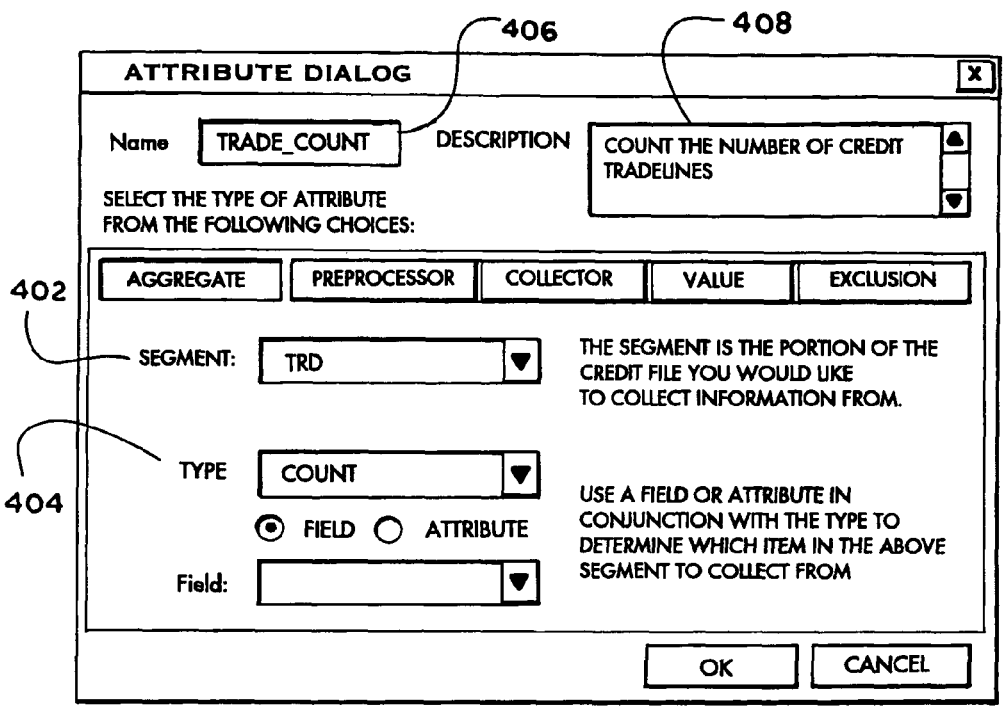
FIGS. 4-8 illustrate screenshots of a user interface for generating attributes with an Autopilot component in accordance with an embodiment of the invention.
Figure 5:
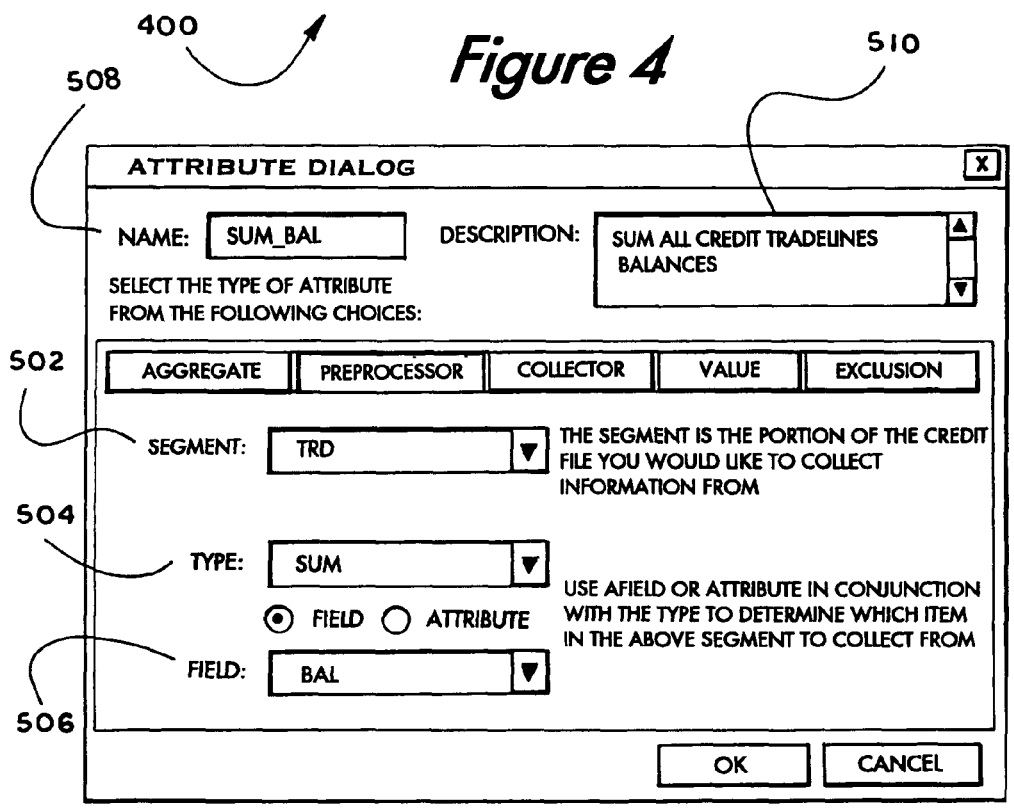
Figure 6:
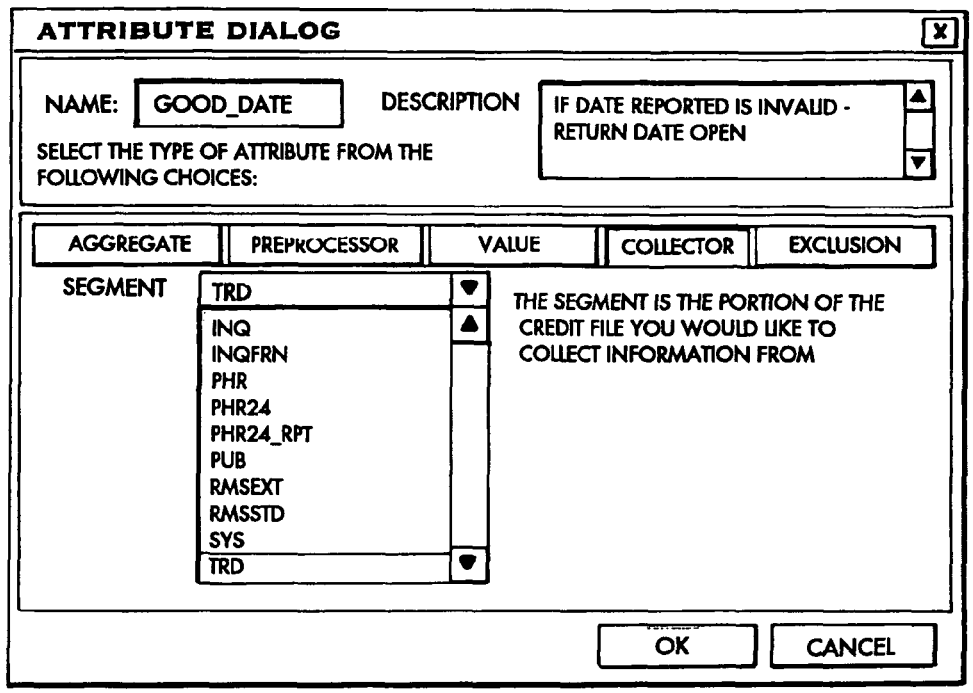
Figure 7:
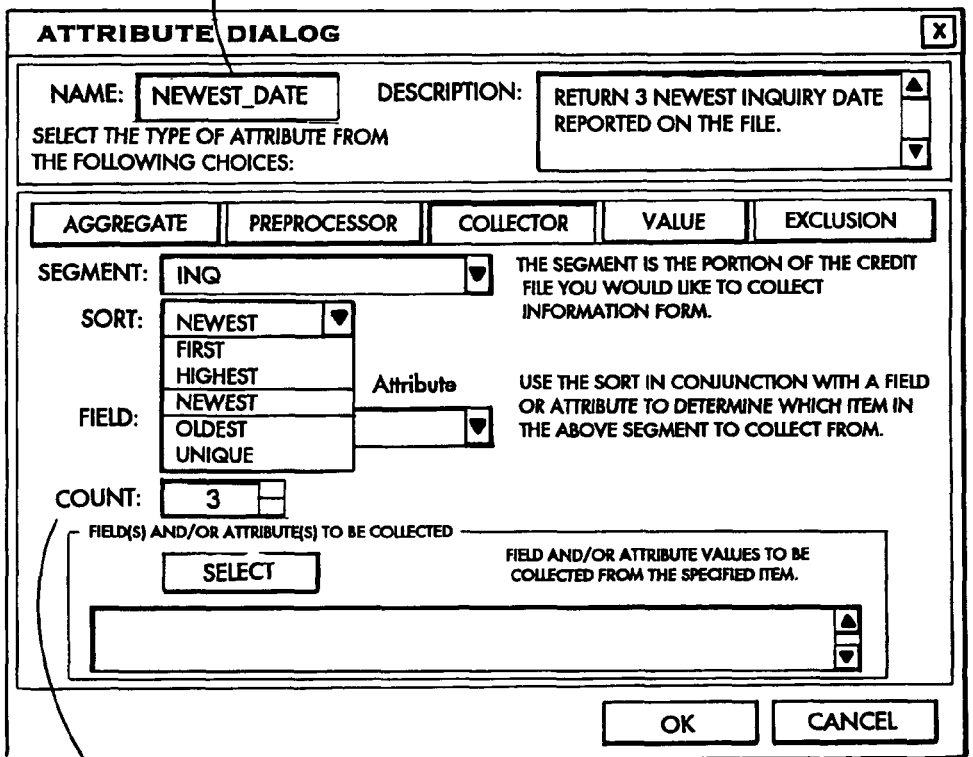
Figure 8:
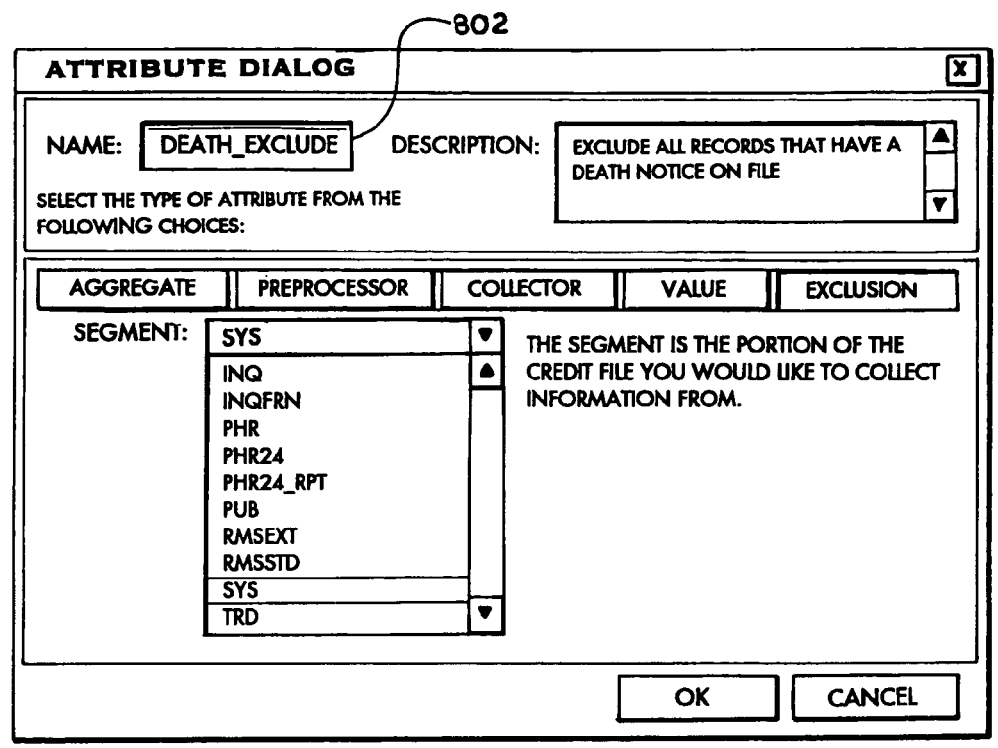

FIGS. 4-8 illustrate screenshots of example user interfaces for an Autopilot component in accordance with embodiments of the invention, and for selecting attributes associated with a request. One example of a graphical user interface that can be implemented by the Autopilot component 202 is an attribute building tool or "aggregation type attribute" tool. An example screenshot of a user interface 400 for this particular tool is shown in FIG. 4. The Autopilot component 202 can provide various attribute building tools that users 112a-n can create a range of attribute types. The aggregation type attribute tool can allow a user 112a-n to create an attribute that can aggregate any specific type of data that exists on a particular credit file from a credit data source 170a-n. For example, a user 112a can input various data such as selecting a particular part of a credit file or segment 402, such as "TRD," and selecting a particular aggregation data type 404, such as "Sum," into the user interface shown in FIG. 5. Name 406 of the attribute, such as "TRADE_COUNT," and a description 408, such as "Count the number of credit tradelines," can be shown in the adjacent portion of the user interface 400. Using a mouse or other input device associated with a client device 102a, the user 112a can build various attributes that can determine a count, sum, min, max, and average of any portion of a credit file from a credit data source 170a-n. Examples of these types of attributes are:

Count—Output the number of trades with a date reported <=6 months.
Sum—Output the sum of all bankcard balances on the credit record.
Min—Output the lowest balance of all bankcard trades.
Max—Output the highest balance of all bankcard trades.

Average—Output the average sum of bankcard balances on the credit record.

List—The list aggregation attribute compiles a list of records that meet a stated condition provided by a user for the particular attribute. Note that the compiled list is designed only to be used by user functions which provide additional functionality not provided in the standard attribute types.

Another example of a graphical user interface that can be implemented by the Autopilot component 202 is a "pre-processor aggregation attribute" tool. An example screenshot for a user interface 500 for this particular tool is shown as FIG. 5. The pre-processor aggregation attribute type tool is similar to the aggregation attribute type tool above except that this particular tool provides a user 112a-n with the ability to aggregate data on the file before any other aggregation takes place. For example, a user 112a can input various data such as selecting a segment 502, type 504, and field 506, such as selecting segment "TRD," type "Sum," and field "BAL," into the user interface shown in FIG. 5. A name 508 of the attribute, and a description 510 can be shown or otherwise input in the adjacent portion of the user interface 500. If a particular project requires replacing all invalid balances with the total average balance of the credit record then the user would create a pre-processor aggregation attribute such as a "SUM_BAL" to find the average of all valid balances on a portion of the file, such as in the "TRD" segment. The user 112a can then use that average as a value type attribute when checking for balances in other areas of the project. Another example is to calculate the number of trades open since a bankruptcy occurred. The pre-processor aggregation attribute tool could run through the file a first time, and find the bankruptcy date and then a standard aggregation count attribute can be used to run through a second time to count the number of records open after the bankruptcy date found with the pre-processor aggregation attribute tool.

Another example of a graphical user interface that can be implemented by the Autopilot component 202 is a "value attribute" tool. An example screenshot for a user interface 600 for this particular tool is shown as FIG. 6. A value attribute tool allows a user 112a to evaluate a condition for a particular portion of a credit file in a credit data source 170a-n, and return a value to be used in other attribute types. Such values can then be used in attributes for any other tools such as aggregation, pre-processor, data collection, definition, and global exclusion. An example of a value attribute would be if a particular user 112a desired to use "date reported" if the "date open" was invalid. To accomplish this, the user 112a can set up a value attribute that states, "If Date Open=Invalid Return Date Reported Else Return Date Open." This statement can allow the user 112a to use the value attribute in place of the Date Open in all places of a particular project that requires the default of Date Reported for invalid Date Open.

Another example of a graphical user interface that can be implemented by the Autopilot component 202 is a "data collection attribute" tool. An example screenshot for a user interface 700 for this particular tool is shown as FIG. 7. The data collection attribute allows a user 112a to collect the First, Highest, Oldest, Newest, or Unique trade, public, or inquiry record as well as all other data associated with a particular credit file from a credit data source 170a-n. For example, a data collection attribute "NEWEST DATE" can be created for the Newest Inquiry Dates associated with a particular tradeline. Such a data collection attribute can find the newest inquiry dates, and then return a preselected number, such as three, of the newest inquiry dates for the particular tradeline.

Another example of a graphical user interface that can be implemented by the Autopilot component 202 is a "global exclusion attribute" tool. An example screenshot for a user interface for this particular tool is shown as FIG. 8. A user 112a can create a global exclusion attribute to exclude a specified condition across all selected criteria and/or data output attributes for a particular project. In the example shown, a user 112a can generate a global exclusion attribute such as "DEATH_EXCLUDE" to exclude all credit files that have a death notice in the file or in a particular portion of the file. By way of further example, if a global exclusion attribute can be created to exclude all trades with a date reported>6 months then no other attributes created will examine trades>6 months. In either instance, the attribute only has to be created and used one time, but it is global across all attributes, criteria, and output data.

In one embodiment, a user interface 302 for an Autopilot component 202 can be associated with a graphical user interface HTML viewer that can be used with suitable programming codes such as HTML, C++, MFC, and XML. As various criteria and attributes are selected, the server 304 can generate a request document such as a Extensible Markup language (XML) document that comprises the selected criteria and attributes and any other instructions from the user 112a-n for processing the project. Such types of documents can provide portability to other operating systems or platforms, and further provide compatibility with a range of operating systems or platforms, and databases.

The server 304 can provide an abstraction layer for file and data layouts as well as a database description of attribute types, criteria, and criteria passing. In response to receiving the request document and associated criteria and attributes from the user 112a-n, the server 304 can utilize particular DLLs or other executable components to access and filter credit data in one or more credit data sources 170a-n, and to capture credit file layouts from the credit data, selected criteria, and selected and underlying data attributes in the databases using tables, or other devices and techniques. For example, the server 304 can combine pre-existing or generate new DLLs or other executable components for processing a request, such as a source select list, a utility select list such as general purpose utilities, a criteria module such as a criteria DLL for processing credit file analytics, and models such as a scoring model DLL. When the DLLs or other executable components are collected, then the project can be transmitted to the data processing component 204 via the data processing interface 308 for processing which is described in greater detail below.

Prior to transmitting the project for processing, the server 304 can interact with the user 112a-n to verify criteria and attributes, and to further develop and to test criteria and attributes for the particular project. Various technologies for the server 304 to create documents for interacting with the user 112a-n can include, but are not limited to, JAVA, HTML, JavaScript, CSS, and XSLT.

FIGS. 9-14 illustrate screenshots from a particular implementation of the Autopilot component according to some embodiments of systems and processes according to the present invention. FIGS. 9-14 illustrate user interfaces for developing criteria and attributes associated with the Autopilot component 202, including an active project workspace, a user function accessing a score card model in criteria, a criteria example, a project repository, an input map, and an output map.

Figure 9:
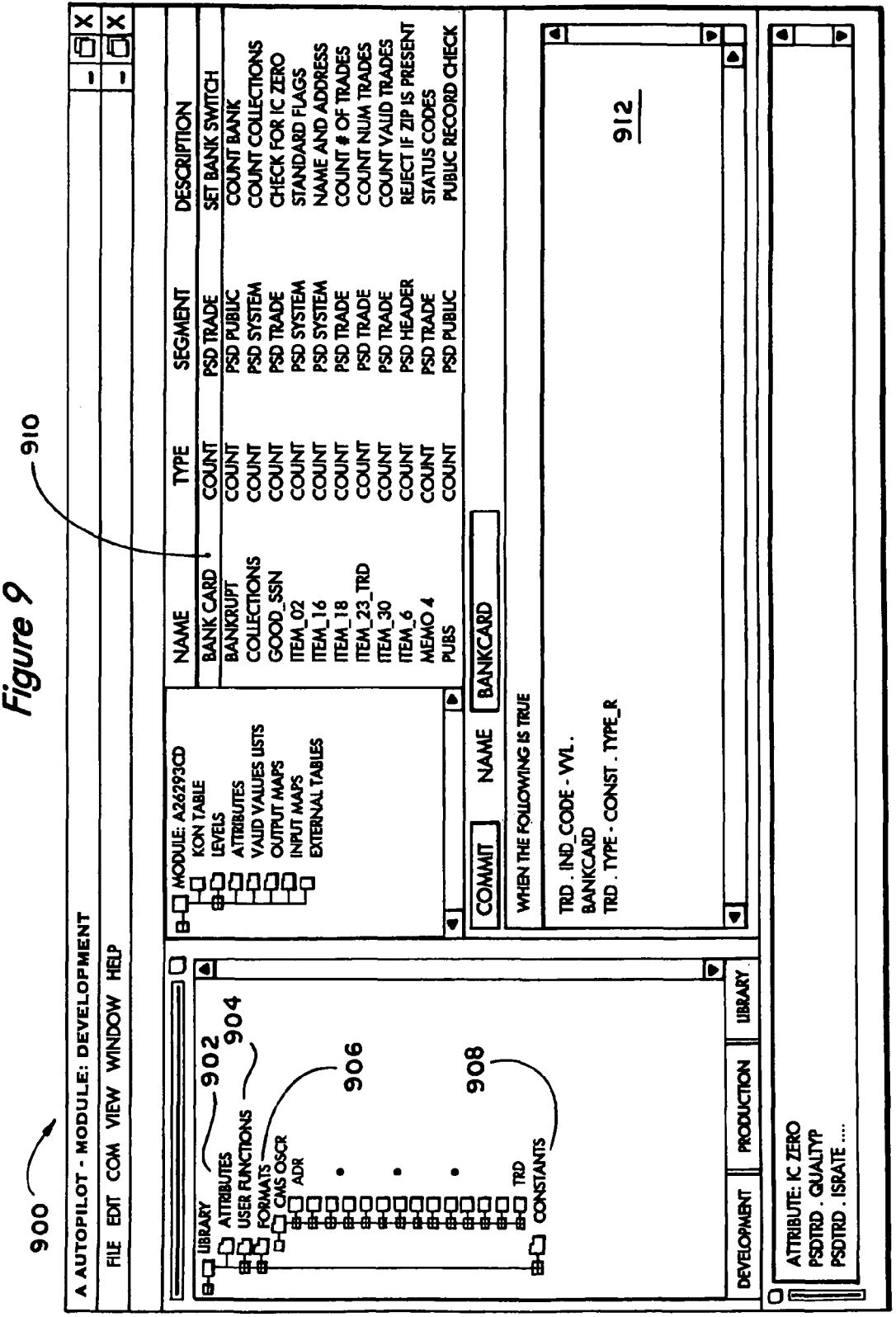
FIGS. 9-14 illustrate screenshots of a user interface for selecting attributes and generating criteria with an Autopilot component in accordance with an embodiment of the invention.

FIG. 9 is a screenshot of a user interface for an Autopilot component in accordance with an embodiment of the invention. In this screenshot, an example of an "active project workspace" is shown. As shown in FIG. 9, a graphical user interface 900 provides various folders and menus for a user 112a-n to access library content such as attributes 902, user functions 904, formats 906, and constants 908. In the example shown, a particular attribute 910 such as "BANKCARD" can be selected and highlighted. Information 912 associated with the attribute 910 can be also displayed.

Figure 10:
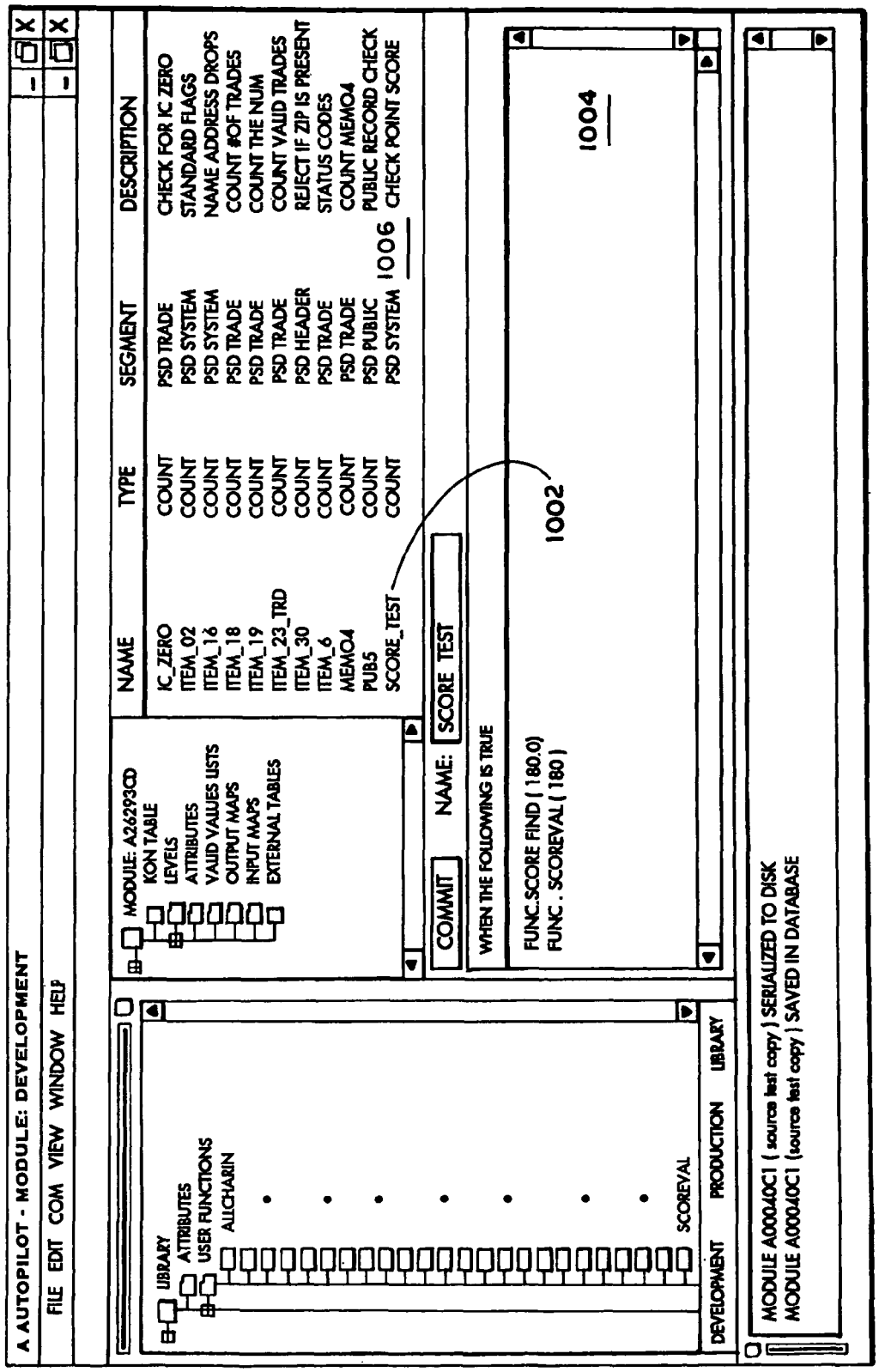

FIG. 10 is a screenshot of a user interface for an Autopilot component in accordance with an embodiment of the invention. In this screenshot, an example of a "user function accessing a score card model in criteria" is shown. As shown in FIG. 10, a graphical user interface 1000 can provide a user 112a-n various folders and menus to selected a predefined user function 1002 that includes one or more modeling criteria. In the example shown, a predefined user function 1002 such as "SCORE_TEST" can be selected. The definition 1004 of the predefined score function 1002 can be displayed as, for example, "FUNC.SCOREFIND (180,0)>0 AND FUNC.SCOREVAL (180)<=600." Other information 1006 associated with the predefined user function 1002 can also be displayed.

Figure 11:
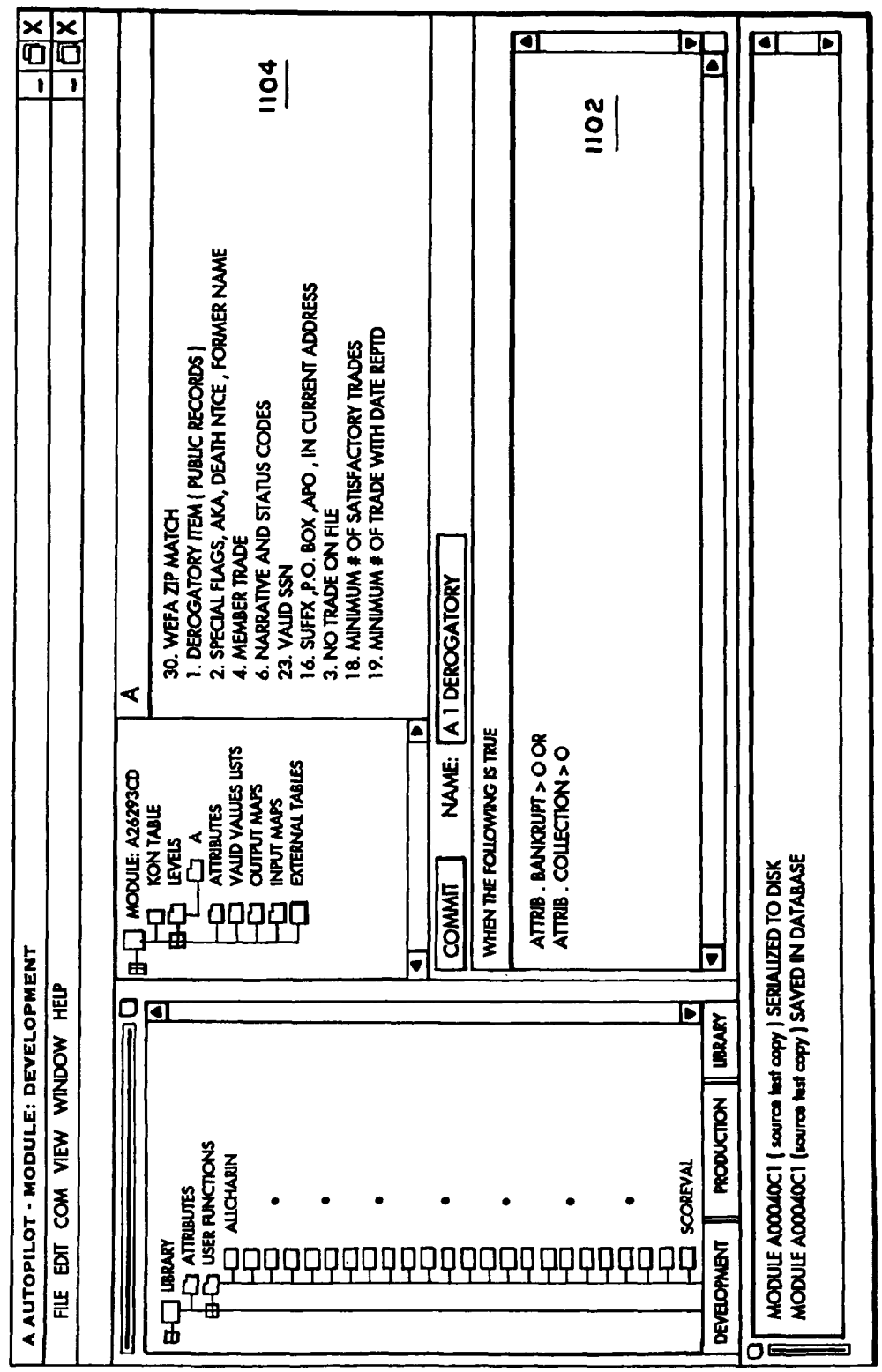

FIG. 11 is a screenshot of a user interface for an Autopilot component in accordance with an embodiment of the invention. In this screenshot, an example of "criteria example" is shown. As shown in FIG. 11, a graphical user interface 1100 can provide a user 112a-n various folders and menus to select attributes and to generate modeling criteria 1102. In the example shown, a modeling criteria 1102 such as "ATTRIB.BANKRUPT>0 OR ATTRIB.COLLECTIONS>0" can be generated and displayed. Information 1204 associated with the modeling criteria 1102 can also be displayed.

Figure 12:
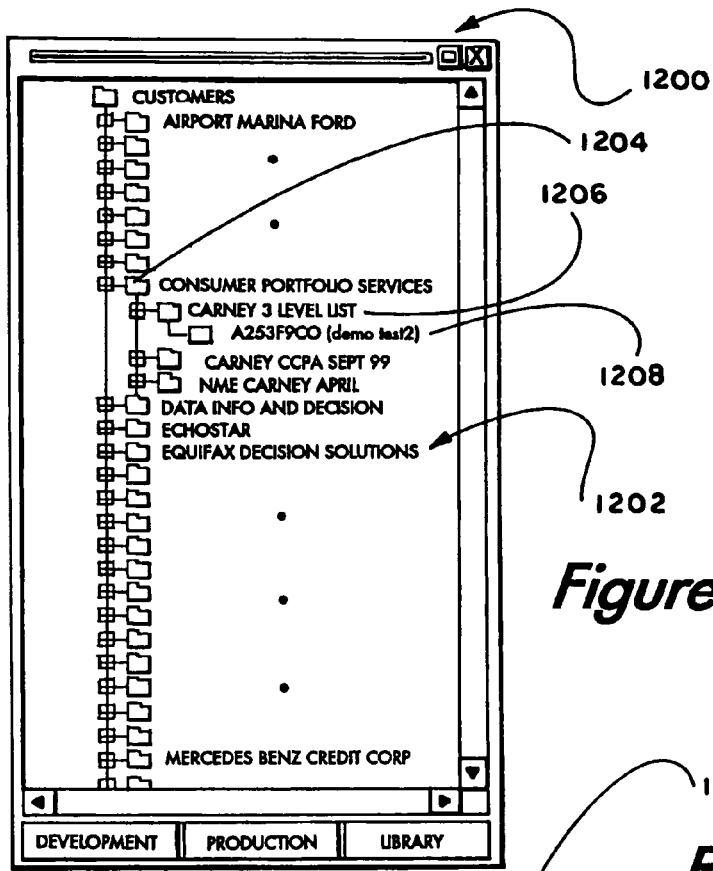

FIG. 12 is a screenshot of a user interface for an Autopilot component in accordance with an embodiment of the invention. In this screenshot, an example of a "project repository" is shown. As shown in FIG. 12, a graphical user interface 1200 can provide a user 112a-n various folders and menus to store a project 1202 or a file. In the example shown, a project 1202 such as "A253F9CO" can be generated and stored in a database such as a repository. Information associated with the project 1202, such as an associated folder 1204 and subfolders 1206, 1208 can also be displayed.

Figure 13:
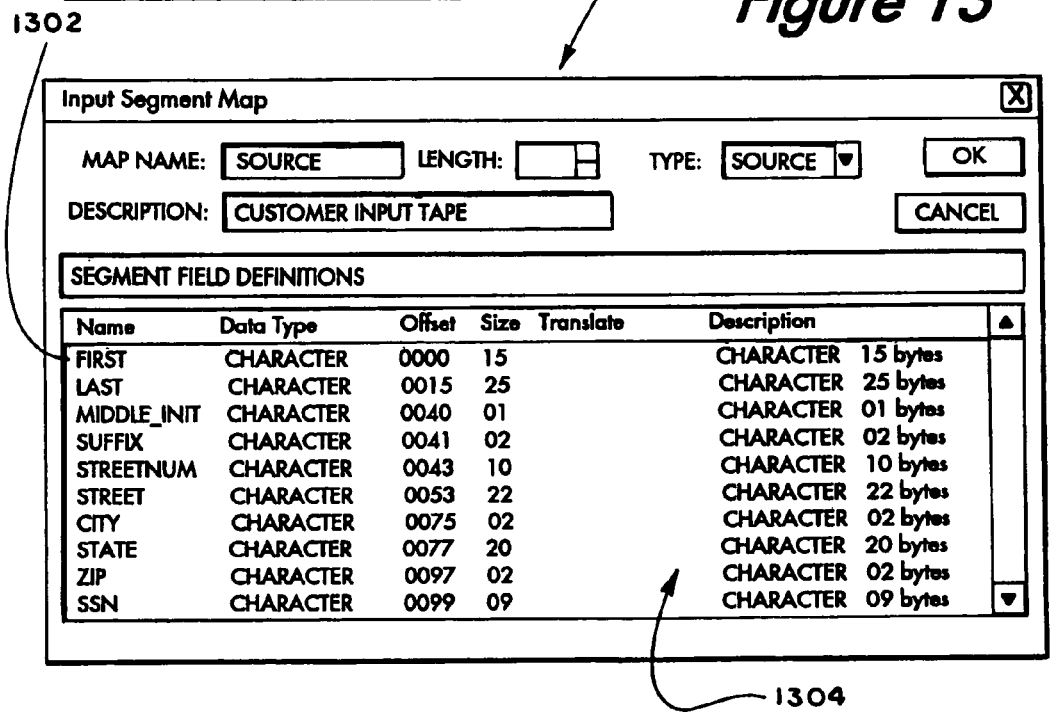

FIG. 13 is a screenshot of a user interface for an Autopilot component in accordance with an embodiment of the invention. In this screenshot, an example of an "input map" is shown. As shown in FIG. 13, a graphical user interface 1300 can provide a user 112a-n various folders and menus to review and select a particular input 1302. In the example shown, an input 1302 such as "FIRST" can be displayed and associated information 1304, such as data type, size, offset, translate function, and description, can be reviewed. In this manner, external data sources or other sources of information can be made available to the Autopilot component 202, and can be incorporated with one or more credit data sources 170a-n, to be used in subsequent decisioning or other processing by the Autopilot component 202.

Figure 14:
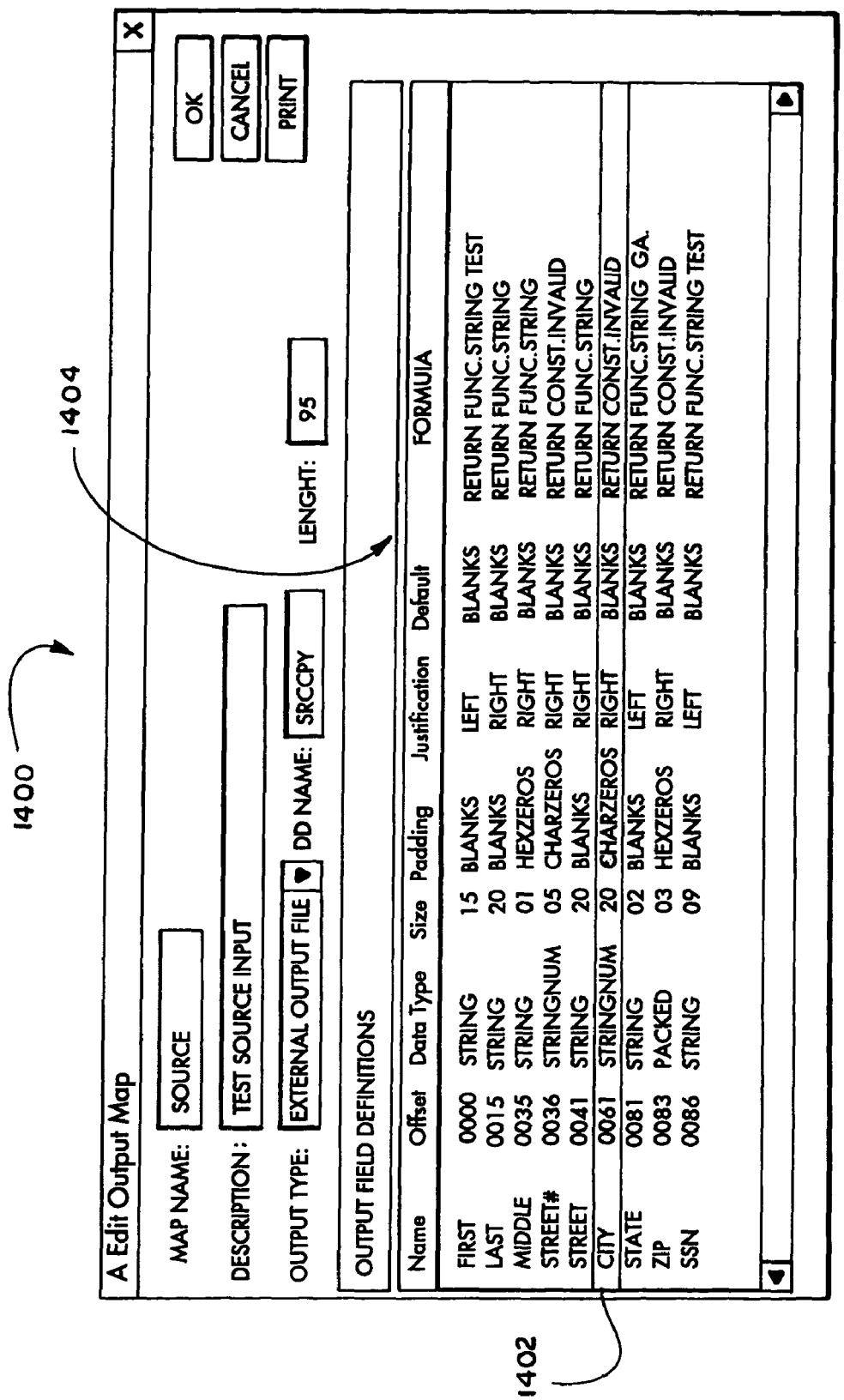

FIG. 14 is a screenshot of a user interface for an Autopilot component in accordance with an embodiment of the invention. In this screenshot, an example of an "output map" is shown. As shown in FIG. 14, a graphical user interface 1400 can provide a user 112a-n various folders and menus to review and select a particular output 1402. In the example shown, an output 1402 such as "CITY" can be displayed and highlighted. Associated information 1404, such as data type, size, offset, padding, justification, default, and formula, can be reviewed. In this manner, the Autopilot component 202 can generate external data files in various formats, wherein such external data files can contain any type of format or data available to the Autopilot component 202.

After any feedback from the user 112a-n is received regarding development and testing of any criteria and attributes, the server 304 can compile the various criteria, attributes, project specifications, credit data and formats from the credit data sources 170a-n, and any other user input or associated project information from the database 306, into an executable computer code or executable computer language for processing. This translation process can take a relational description of the user request (or project) stored in the database 306, and can create respective descriptor records for each pertinent element of the request, which can include but is not limited to, attributes, criteria, input and output descriptions, and sequential processing directions regarding modeling criteria decisioning. These descriptor records can then used as input to a code generation process that can produce a procedural computer language source file that can be compiled and can be linked with a suitable runtime component for a desired target environment selected by the user 112a-n. Such executable computer code or executable computer language can be transmitted to the data processing component 204 via the data processing interface 308 for processing.

In any instance, after an executable computer code or executable computer language is compiled by server 304, the Autopilot component 202 can transmit the executable computer code to the data processing component 204 via the data processing interface 308. After processing the project via a suitable runtime component such as 122a-n, including and any associated DLLs or other executable components, the Autopilot component 202 can receive result data associated with processing the associated executable computer code or executable computer language for the project. Such result data can be transmitted to the user 112a-n for display on the client device 102a-n via the user interface 302.

The Autopilot component 202 can also provide for decomposition of criteria into reusable objects such as criteria modules. By using standard naming conventions for attributes and criteria, and by managing and storing result data from particular projects, the Autopilot component 202 can reuse some or all result data associated with particular criteria and/or attributes when similar projects are requested. Such result data can be packaged and associated with the respective criteria into a "criteria module." For example, the Autopilot component 202 can communicate with a backend server that takes a standard relational database management system (RDBMS) description of a particular project, such as a criteria module, and can compile a runnable module for use in a particular operating environment. Such runnable modules can be utilized for various operating systems or platforms including, but not limited to, Windows NT®, UNIX®, AIX®, personal computers, parallel processing platforms, assembler mainframe, and supercomputers. Each of the runnable modules generated by the Autopilot component 202 includes executable computer code linked with a suitable runtime component such as 122a-n. The Autopilot component 202 can utilize a memory 118 or a standard relational database management system (RDBMS) to store, edit, and replicate result data and criteria modules as needed for subsequent retrieval and processing. In one example, the Autopilot component 202 can generate executable criteria modules, and store or otherwise locate them in repositories, libraries, memory, databases, or other storage devices associated with the data processing component 204 in FIG. 3B.

In this manner, the Autopilot component 202 can reduce or otherwise can eliminate conventional manual efforts required to manually produce executable computer code for processing by the data processing component 204. The Autopilot component 202 shown in FIG. 3A can utilize various credit compile techniques that translate into speed and time to market advantage for a credit data company and its customers. In this manner, time consuming and expensive processing power can be minimized at compile time and can further be minimized at run or processing time.

In another embodiment, the user interface 302 can be used for testing selected criteria and attributes. As described above, the Autopilot component 202 can permit a user 112a-n to select particular criteria and attributes from a "point-and-click" graphical user interface. Similar types of user interfaces can provide "point-and-click" graphical user interfaces for testing of selected criteria and attributes. For example, the Autopilot component 202 shown in FIG. 2 can provide a workstation environment for the specification and testing of selected criteria and attributes. Such an environment, much like a programming integrated development environment such as Visual C++ for a programmer, can provide a relatively easy to use "point-and-click" capability for a user 112a-n to accommodate testing a customized request for criteria and/or attributes, which for example, can be a filter for a particular customer data set for generating a prescreening list of credit of potential customers. A prescreening list can identify potential credit consumers for solicitation campaigns. For example in one embodiment, the Autopilot component 202 can communicate with the Modeling component 206, described below in FIG. 3C, to implement an automated process to reduce the cycle time of prescreening credit data from one or more credit data sources 170a-n. A request with particular criteria and attributes from a user 112a-n can be used to prescreen credit data from one or more credit data sources 170a-n. Several iterations of developing and generating criteria and attributes may be needed to generate a request that obtains an optimized list of credit data for a prescreening list. In this manner, manual handling of the request can be reduced, and associated programming personnel can improve productivity and can reduce costs in fulfilling such requests.

In one embodiment, the Autopilot component 202 can interact with the Modeling component 206 via the data processing interface 308 to provide test scripts that allow a user to iteratively test versions of criteria against sample sets of data to produce auditing information for verifying particular criteria. For example, the Autopilot component 202 can interact with the Modeling component 206 via the data processing interface 308 to test criteria against sample sets of credit data. Sample sets of data can include, a small population of actual credit records from a credit data source 170a-n. The Autopilot component 202 can receive test result data and other modeling information from the Modeling component 206 evaluating criteria that have been tested against the sample sets of data. After receiving the test result data and other modeling information, a user 112a-n can modify the criteria and/or attributes, and re-test the modified criteria against the sample sets of data, until a satisfactory set of result data is obtained. That is, iterative test versions of criteria can be repeatedly processed by the Autopilot component 202 and Modeling component 206 to produce advanced auditing information to improve each version of the criteria until a satisfactory result is obtained. Information associated with such testing and validation of criteria, including particular attributes, search algorithms, models, or other coding can be displayed on the user interface 302 by the Autopilot component 202 in real time, thus saving significant time, effort, and expense in formulating, running, and auditing a request or a project. Furthermore, since such work is performed by components of the automated criteria and attribute application engine 120 in a workstation environment rather than an expensive platform such as a mainframe platform, significant savings in fulfillment costs can be achieved. In this manner, development of portable modeling criteria and business knowledge permits various types of users, such as a customer and company representative, to work together to refine a "right" set of modeling criteria to provide the customer the "right" set of data from various credit data sources 170a-n by providing an iterative process in a relatively affordable computing environment.

In one embodiment, the Autopilot component 202 can allow users to generate and refine their modeling criteria within the overall framework of the other components of the automated criteria and attribute application engine 120. For example, the Autopilot component 202 can receive concise specifications from a user 112a-n to focus processing on only changed or relatively new credit data in multiple credit reporting databases while credit data that remains the same can be automatically set up by and processed by the Autopilot component 202.

Figure 3B:
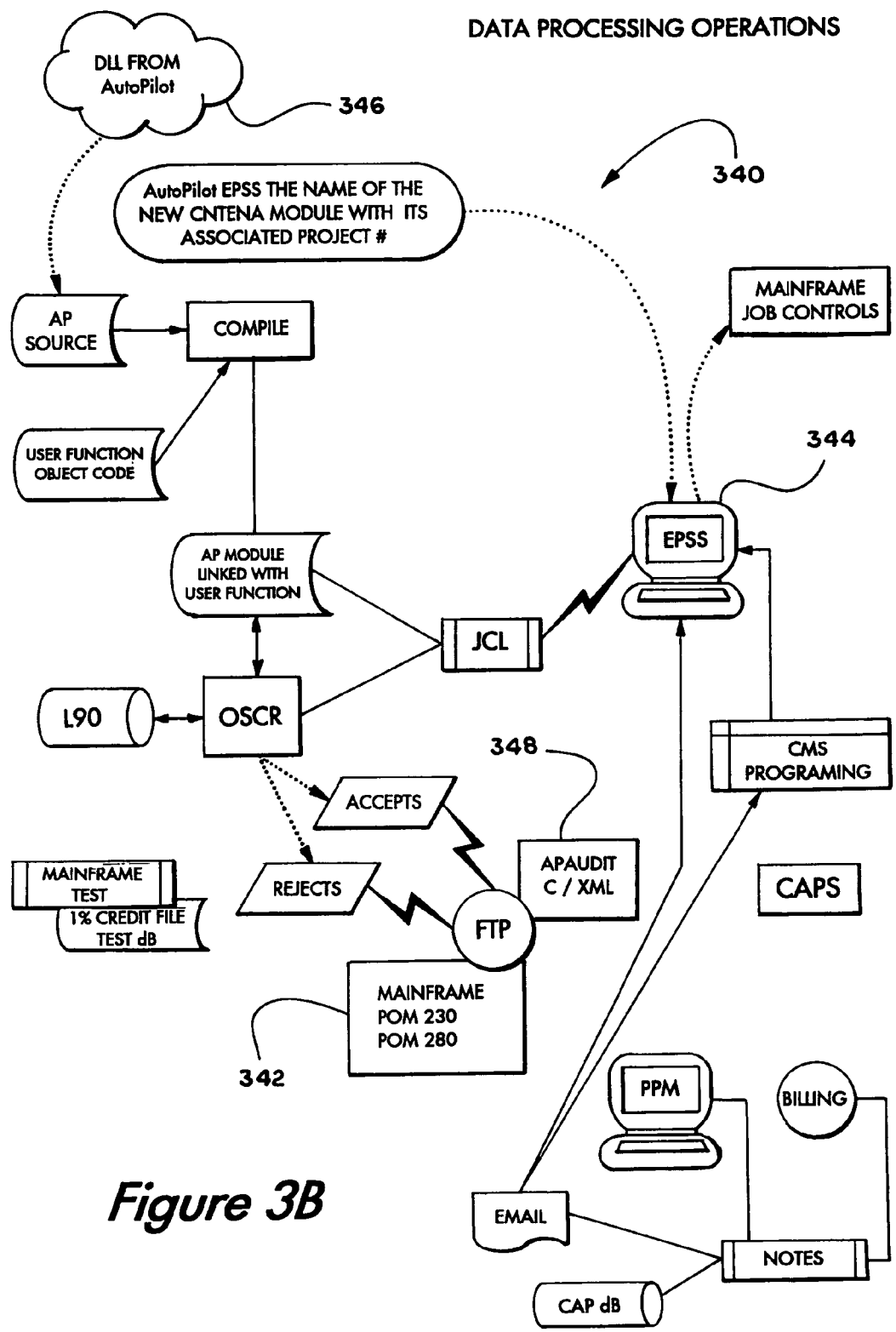
FIG. 3B illustrates an example of a process flow for a Data Processing component in accordance with an embodiment of the invention.
Figure 3C:
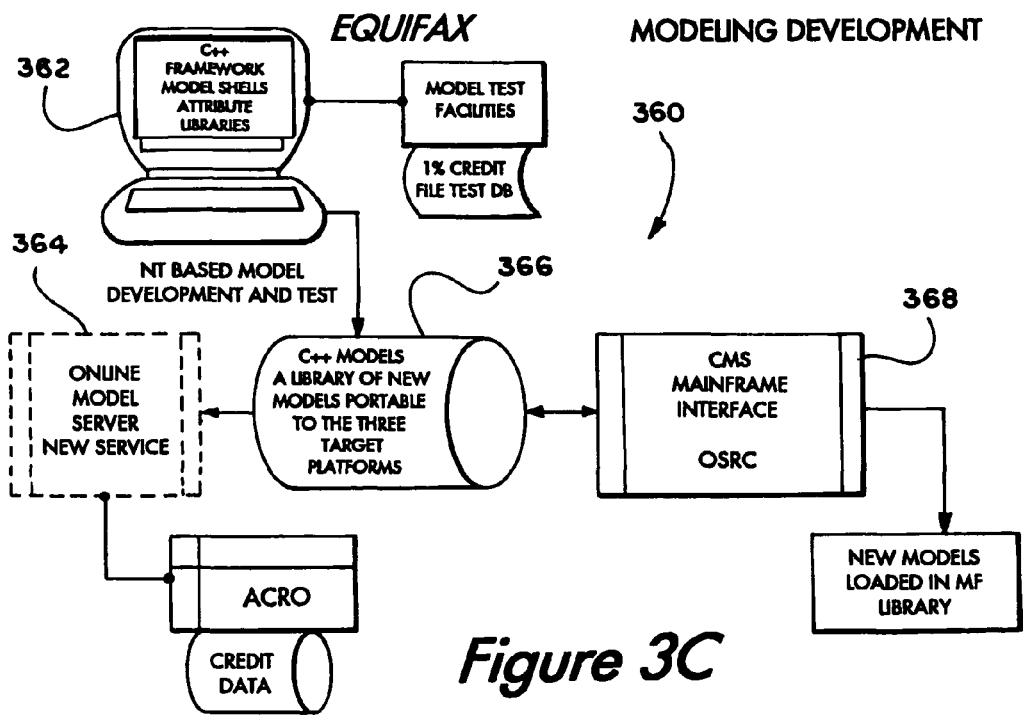
FIG. 3C illustrates an example of a process flow for a Modeling component in accordance with an embodiment of the invention.

In some embodiments, depending on strategy implemented by the associated Modeling component 206, such testing can include modeling support as described in FIG. 3C. In any instance, after the selected criteria and attributes are approved by the user 112a, the Autopilot component 202 can generate a criteria module that with a suitable runtime component such as 122a-n, can run on various operating systems or platforms, including but not limited to Windows NT®, UNIX®, AIX®, personal computers, mainframes, parallel processing platforms, and supercomputers. In this manner, the Autopilot component 202 can improve the quality and speed of interpreting customer specifications with one or more attributes and modeling criteria for a project into an executable computer language for filtering multiple credit data sources 170a-n.

In one embodiment, the Audit interface 310 can provide communications between the Autopilot component 202 and the Audit component 208. Audit materials, special matrix data, shipping information, and sample or sample test files can be obtained from the Audit component 208 for display on the user interface 302 when needed.

In another embodiment, the Autopilot component 202 can interact with the Audit component 208 via the Audit interface 310 after a user 112a-n such as a customer creates and refines criteria and attributes for a project. Users 112a-n, such as project managers and production programming managers, can audit the project and/or associated test result data via the Audit component 208, and the project and/or test result data can quickly and conveniently be validated.

In one embodiment, the Autopilot component 202 can be an application program, software product, or service that executes directly on a client device 102a-n, such as a personal computer. In a client embodiment, the Autopilot component 202 can be used directly by users 112a-n such as customers.

Figure 15:
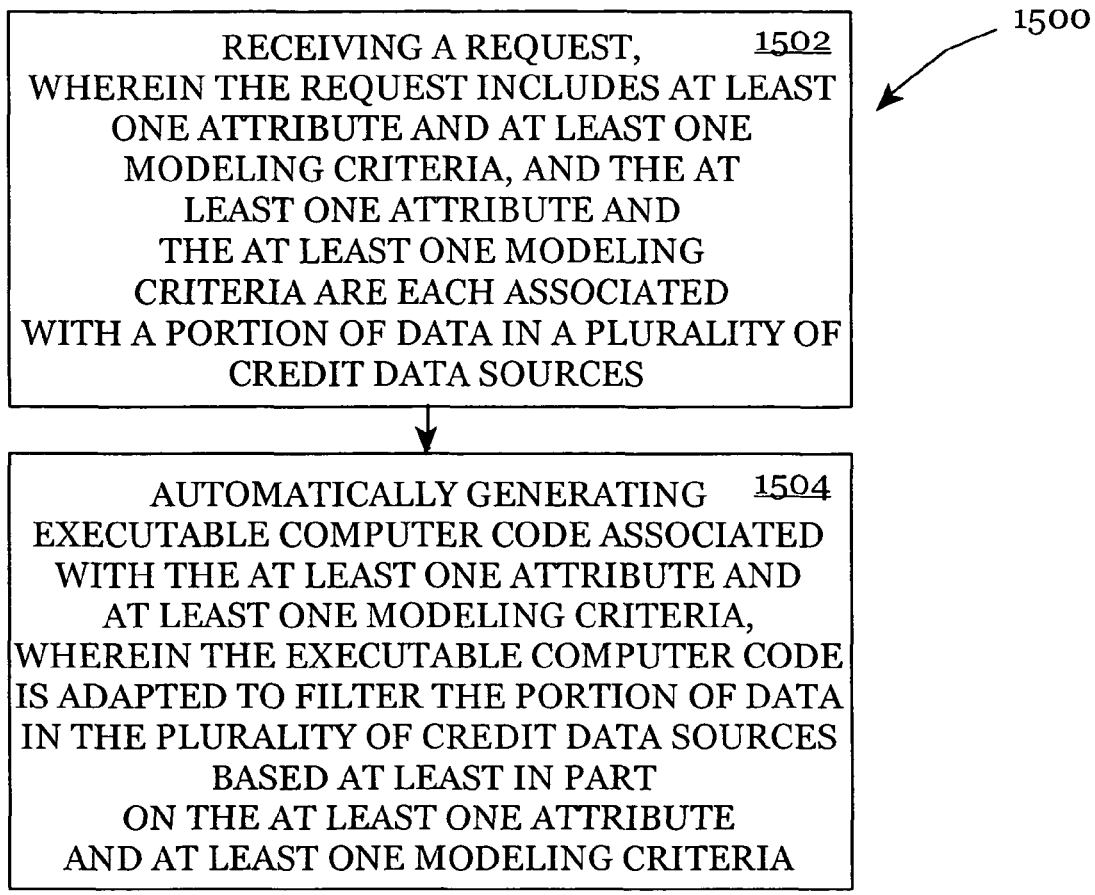
FIGS. 15-17 are illustrations of example methods for an Autopilot component in accordance with embodiments of the invention.
Figure 16:
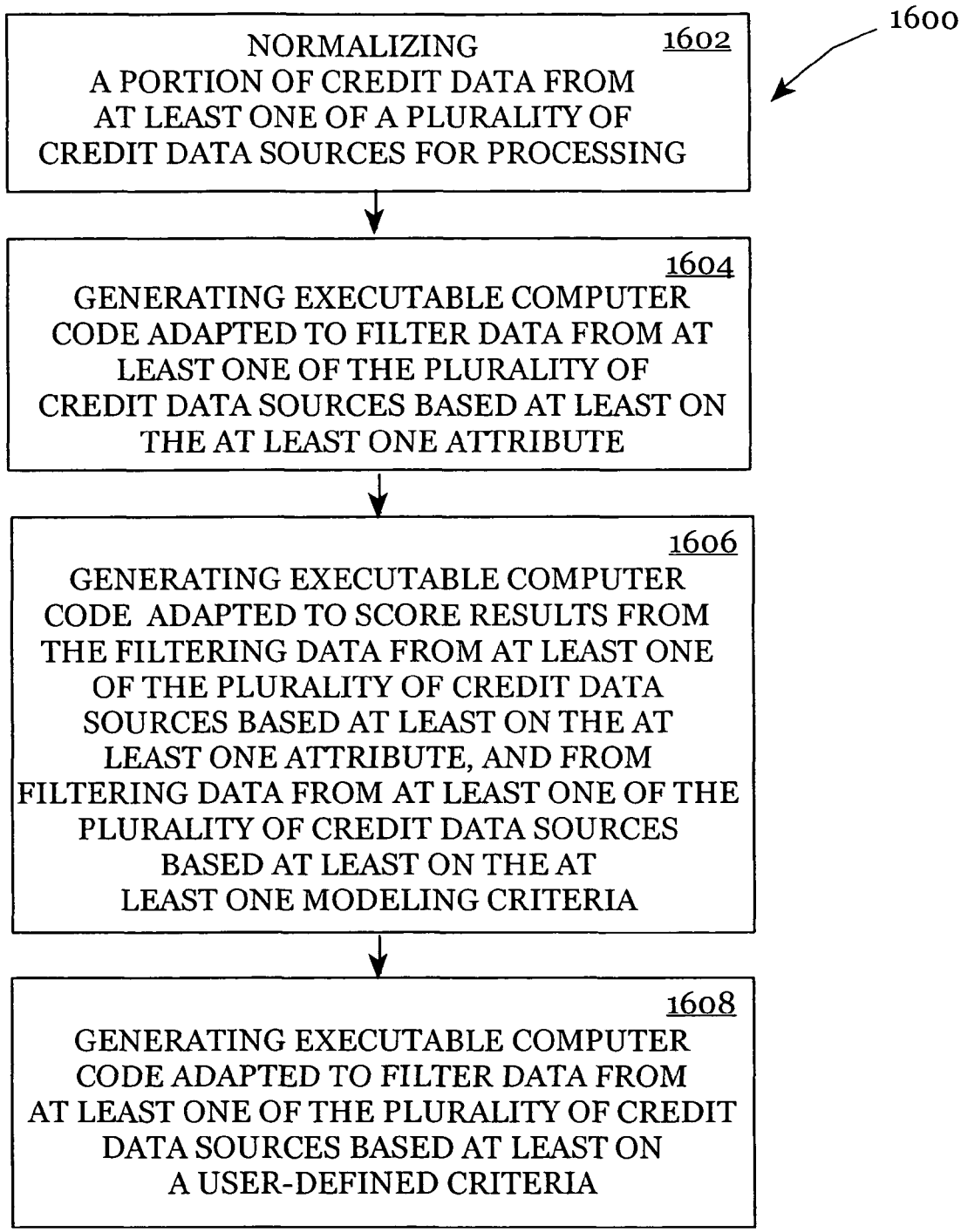

Example methods that can be performed by an Autopilot component, in accordance with embodiments of the invention, are illustrated in FIGS. 15-16. FIG. 15 illustrates a method for translating a request for searching data in a plurality of credit data sources. The method 1500 begins at block 1502, in which a request is received, wherein the request includes at least one attribute and at least one modeling criteria, and the at least one attribute and the at least one modeling criteria are each associated with a portion of data in a plurality of credit data sources.

Block 1502 is followed by block 1504, in which executable computer code associated with the at least one attribute and at least one modeling criteria is automatically generated, wherein the executable computer code is adapted to filter the portion of data in the plurality of credit data sources based at least in part on the at least one attribute and at least one modeling criteria.

FIG. 16 illustrates a method for automatically generating executable computer code from a request for searching data in a plurality of credit data sources, wherein the request is associated with at least one attribute and at least one modeling criteria.

The method 1600 begins at block 1602, wherein a portion of credit data from at least one of the plurality of credit data sources is normalized for processing.

Block 1602 is followed by block 1604, wherein executable computer code is generated for filtering data from at least one of the plurality of credit data sources based at least on the at least one attribute.

Block 1604 is followed by block 1606, wherein executable computer code is generated adapted to filter data from at least one of the plurality of credit data sources based at least on the at least one modeling criteria.

Block 1606 is followed by block 1608, in which executable computer code is generated adapted to score results from the filtering data from at least one of the plurality of credit data sources based at least on the at least one attribute, and from filtering data from at least one of the plurality of credit data sources based at least on the at least one modeling criteria.

Block 1608 is followed by block 1610, in which executable computer code is generated for filtering data from at least one of the plurality of credit data sources based at least on a user-defined criteria.

Figure 17:
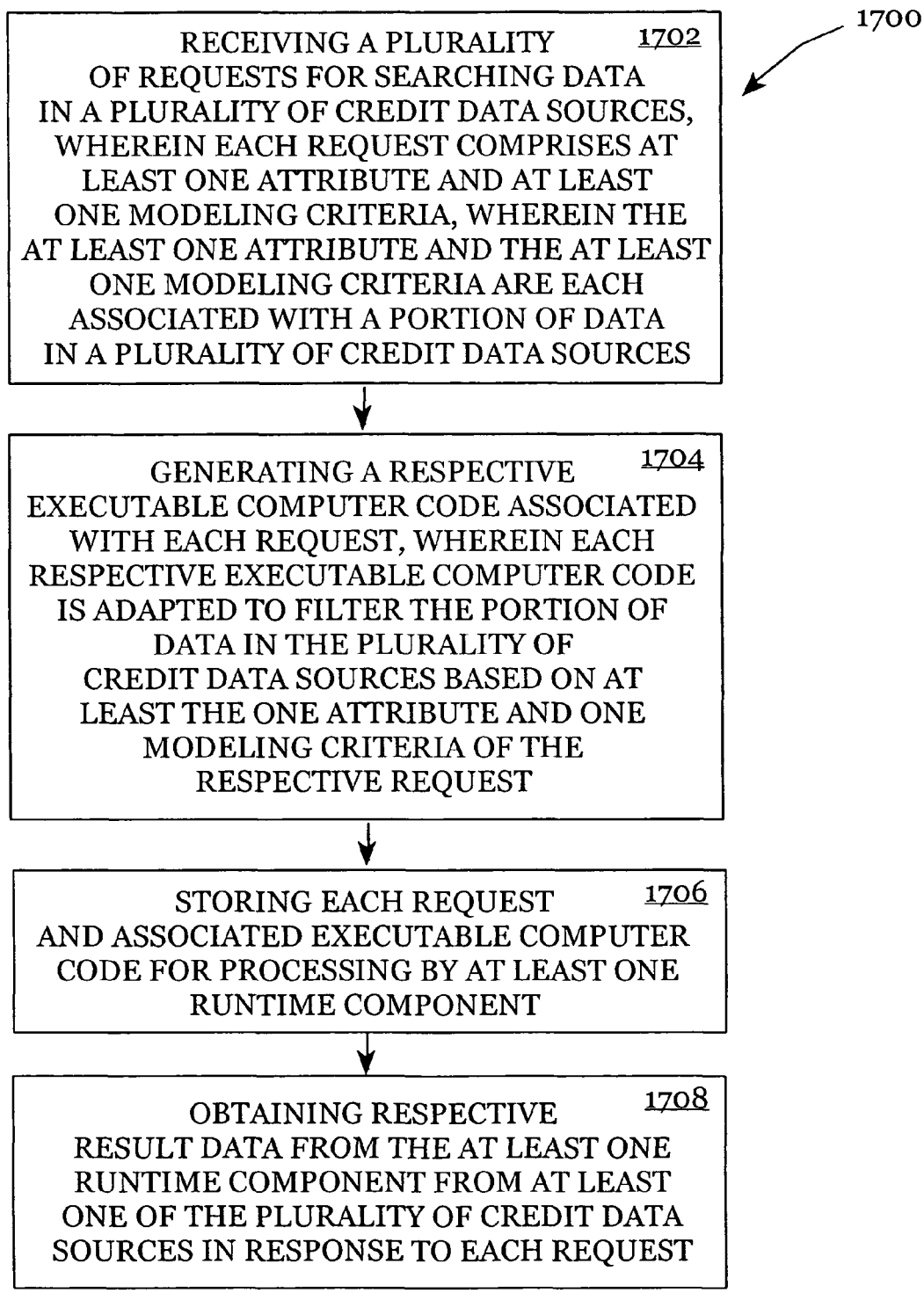

FIG. 17 illustrates a method for managing a plurality of requests for searching data in a plurality of credit data sources. The method 1700 begins at block 1702, in which a plurality of requests for searching data in a plurality of credit data sources Is received, wherein each request comprises at least one attribute and at least one modeling criteria, wherein the at least one attribute and the at least one modeling criteria are each associated with a portion of data in a plurality of credit data sources.

Block 1702 is followed by block 1704, in which a respective executable computer code associated with each request is generated, wherein each respective executable computer code is adapted to filter the portion of data in the plurality of credit data sources based on at least the one attribute and one modeling criteria of the respective request.

Block 1704 is followed by block 1706, in which each request and associated executable computer code are stored for processing by at least one runtime component.

Block 1706 is followed by block 1708, respective result data is obtained from the at least one runtime component from at least one of the plurality of credit data sources in response to each request.

Data Processing Component and Processes

FIG. 3B is an illustration of a process flow environment 340 for a data processing component 204 in accordance with an embodiment of the invention. As shown in the embodiment of FIG. 3B, the data processing component 204 can provide automated processing of executable computer code or executable computer language for a request to search credit data in credit data sources 170a-n. The data processing component 204 shown in FIG. 3B can include a data processing platform 342, user interface 344, an Autopilot interface 346, and an Audit interface 348.

In the embodiment shown in FIGS. 2 and 3B, the data processing component 204 can process credit data from the credit data sources 170a-n using attributes, criteria, project specifications, executable computer language, executable computer code, criteria modules, DLLs, other executables, or other instructions provided by the Autopilot component 202, or other components of the automated criteria and attribute application engine 120. For example, the data processing component 204 can communicate with and coordinate its functionality with the Autopilot component 202, Modeling component 206, and the Audit component 208 via respective interfaces. By way of further example, some or all of the other components 200, 202, 206, 208 can format a request, and submit the request to the data processing component 204 to obtain result data in response to the request. By way of further example, some or all of these other components 200, 202, 206, 208 can submit projects including multiple requests, and submit the requests for processing in a high-speed batch mode to obtain result data from the data processing component 204.

When the data processing component 204 receives a particular request for processing, the request and associated criteria, attributes, project specifications, associated DLLs or other executable components can be processed or otherwise executed. For example, stackable execution elements such as DLLs and other executable instructions can be distributed to various portions of the data processing component 204 for processing.

By way of further example, a request such as a XML document request can be received by the data processing component 204. The data processing component 204 can utilize XML definitions to collect execution elements from various queues, libraries, repositories, databases, or other utility sources such as an Oracle® library services database or a data processing production "executables" library. Stackable execution elements such as DLLs can be deployed to various portions of the data processing component 204 for processing of credit data. The data processing component 204 can process the credit data through each of the execution elements until a set of result data is obtained. Note that each execution element can apply filters, routines, methods, techniques, logic, selection, assessment, or analysis as required.

For example, the data processing platform 342 can provide operational processing support to the various other components of the automated criteria and attribute application engine 120. For example, the data processing platform 342 can communicate with the Autopilot component 202 via the Autopilot interface 346 to receive instructions to construct executable computer code or executable computer language for a particular request, project, query, or job. By way of another example, the data processing platform 342 can communicate with the Audit component 208 via the Audit interface 348 to receive changes for a particular executable computer code or executable computer language for a particular request, project, query, or job. A user 112a-n such as a programming production manager can utilize the user interface 344 to monitor, generate, edit, and establish a job flow and associated instructions for the processing a particular request, project, query, or job with an executable computer code or executable computer language. In one embodiment, an associated application such as a CAPS application can provide operational and process information to define job flows and intra-step relationships for various components of the automated criteria and attribute application engine 120. The job flow and associated instructions with an executable computer code or executable computer language can be communicated from the data processing platform 342 to other components as needed for subsequent processing of the executable computer code or executable computer language.

In one embodiment, the result data can be made available to the Audit component 208 via the Audit interface 348. Validation and verification of the result data can be performed in accordance with the processes and methods described below in FIG. 3D for the Audit component 208. The data processing component 204 can notify the Audit component 208, and make the result set available for auditing. If called upon, the result set can be transmitted via the Audit interface to the Audit component 208. For example, result data stored by the data processing component 204 in a files such as a project folder can be accessed via the Audit interface 348. In some instances, particular result data can include additional audit data for use by the Audit component 208 that can be stored or otherwise obtained from the data processing component 204.

By way of another example, the request or project can initially call for a particular set of credit data sources 170a-n to be searched for particular criteria and attributes for a project. The data processing component 204 can initially filter the particular set of credit data sources 170a-n to identify the credit files that meet "general" criteria and attributes for the project. This initial set of files can be processed by the data processing component 204. Each of the respective files can be processed according to "main" criteria and attributes for the project to determine result data. In this example, the "main" criteria and attributes is where most of the credit file analytics can be performed. In this example, models and associated scores can also be generated in accordance with any project instructions for such models and scores. When the data processing component 204 has completed processing the respective files, the result data including models and scores from all of the nodes can be collected and stored by the data processing component 204 for subsequent access.

In any instance, credit data and related data in the data processing component 204 can be readily accessed and used by other components 200, 202, 206, 208 of the automated criteria and attribute application engine 120.

Modeling Component and Processes

FIG. 3C is an illustration of an example process flow environment 360 for a Modeling component 206 in accordance with an embodiment of the invention. In the embodiment shown in FIG. 3C, the Modeling component 206 can provide for the development and generation of models to evaluate project results, such as result data obtained in response to a request. Such models can run on multiple operating systems for display to various users operating a variety of different operating systems or platforms. The Modeling component 206 can reduce the amount of mainframe processing time utilized to analyze or test a project since executable computer coding is performed for operation across a number of platforms. In this manner, overall project run time can be significantly reduced. The environment 304 shown in FIG. 3C includes a user interface 362, an online model server 364, model library database 366, and a batch data processing interface 368.

In one embodiment, the Modeling component 206 provides users 112a-n, such as customers, via the user interface 362 with a set of graphical user interface tools including an object-oriented model implementation framework that can increase productivity, enhancing attraction and retention of qualified staff. Such tools can assist with the development of models that can run across multiple operating systems or platforms. For example, when criteria, attributes, and project specifications are selected for a particular project, the Modeling component 206 can be used to run the analytics of a project against a sampling of credit data from a credit reporting database 170a-n. The Modeling component 206 can generate test result data for the project based in part on the selected criteria, attributes, and project analytical specifications. Using the test result data, the Modeling component 206 can generate various models for display on the user interface 362, and based in part on the selected criteria, attributes, and project specifications. Models can be developed by the Modeling component 206 that operate across Microsoft NT® test services, UNIX® or AIX® services, personal computer platforms, parallel processing platforms, mainframe platforms, and supercomputer platforms that support high-speed model processing. Model implementations generated by the Modeling component 206 can be demonstrated and displayed on mainframe platforms, and then, when satisfactory, can be redeployed in whole or part to various other platforms such as supercomputer. In this manner, model development can be redirected from assembler level to tools such as C++ to allow for cross-platform use of newly created models. Since modeling can represent a significant workload on conventional mainframe systems, model processing by the Modeling component 206 can significantly reduce processing cycle time while reducing processing load on mainframe computer systems. This can reduce time for project implementation and increase programmer productivity, thus saving in project costs. Furthermore, this can also directly benefit request fulfillment, and can benefit users developing models by moving models to production quicker than conventional systems and processes.

In one embodiment, the Modeling component 206 can provide for creation, modification, support, and subsequent execution of a score modeling element for a prescreening service. For example a customer can request that a set of analytics, which can include a model, be applied to a particular credit data source 170a-n to provide a score that can be used to identify appropriate names of customers to whom an offer of credit can be extended to.

By way of another example, the Modeling component 206 can also generate run-time code that performs score modeling for new or potential decisioning products. The Modeling component 206 can model performance of a proposed decisioning product. A "decisioning product" is a product offering for a credit company, such as an on-line business offering a line of credit to potential consumers. This can allow users 112a-n, such as a customer, to make informed credit-related choices by accessing particular credit data and other information about individuals and entities in a manner that enhances the users' ability to think more about commercial issues and less about how to extract and process credit data and other information. In this manner, cost savings can be realized by customers since modeling functionality can be performed on a platform other than a mainframe.

In one embodiment, the Modeling component 206 can provide a set of commonly used or market share models. A model can include an analytical algorithm, formula, calculations, or other logic for providing a quantitative or qualitative result. For example, such models can include "housekeeping" models that address issues such as trade processing, public records, and similar data models. These models can be recoded in a suitable language, such as C++, and stored or otherwise located in the model database 366, another database, or other accessible library or repository such as a model library for the data processing component 204. Models can also be created for the aggregation of standard decision data and the collection of variables. By way of another example, the Modeling component 206 can also provide a model that maps credit data for use by various analysis processes. An associated overall model session driver can also integrate one or more models, such as various commonly used, market share, or other models.

As shown in FIGS. 2 and 3C, models and associated information can be shared by the Modeling component 206 with other components 200, 202, 204, 208, 210 of the automated criteria and attribute application engine 120. For example, new C++ models generated by the Modeling component 206 can be transmitted via the data processing interface 368 to the data processing component 204 for subsequent use and storage. In addition, ASM, C, C++ models generated by the Modeling component 206 can be transmitted via the data processing interface 368 for subsequent use and storage.

In one embodiment, the online model server 364 can communicate with a particular credit data source 170a-n to obtain credit data for modeling. In this example, the online model server 364 can provide real time model services to a mainframe client or other type of client using the same or similar code and libraries that the model framework provides in the batch environment for pre-screen processing.

Figure 18:
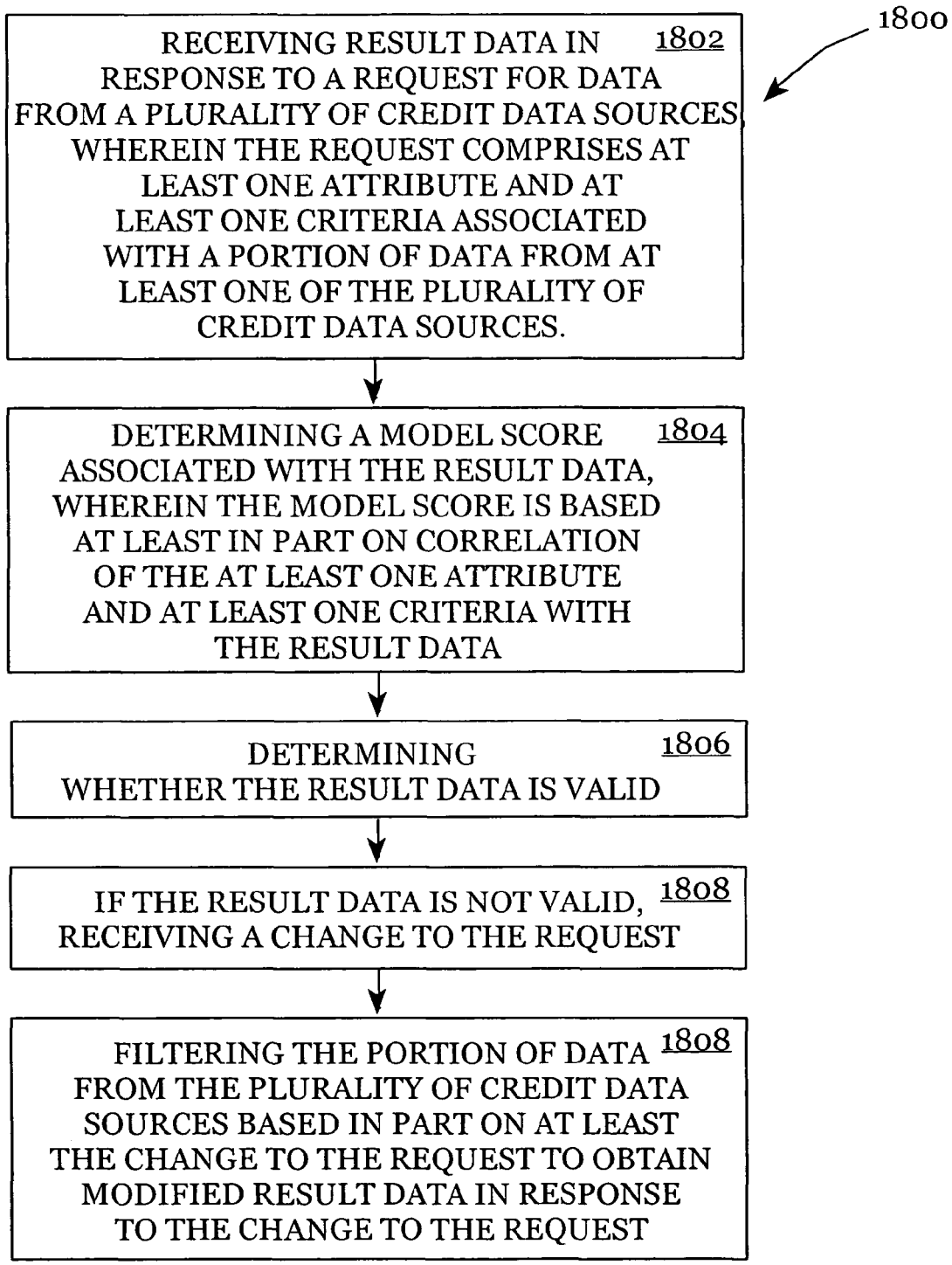
FIG. 18 is an illustration of an example method for a Modeling component in accordance with an embodiment of the invention.

An example method that can be performed by a Modeling component, in accordance with embodiments of the invention, is illustrated in FIG. 18. FIG. 18 illustrates a method for developing result data obtained in response to a request for data from a plurality of credit data sources.

The method 1800 begins at block 1802, in which result data is received in response to a request for data from a plurality of credit data sources, wherein the request comprises at least one attribute and at least one criteria associated with a portion of data from at least one of the plurality of credit data sources.

Block 1802 is followed by block 1804, in which at least one analytical algorithm is applied to determine a model score associated with the result data is determined, wherein the model score is based at least in part on correlation of the at least one attribute and at least one criteria with the result data.

Block 1804 is followed by decision block 1806, in which a determination whether the result data is valid is made.

In Block 1808, if the result data is not valid, a change to the request is received.

Block 1808 is followed by block 1810, in which the portion of data from the plurality of credit data sources is filtered based in part on at least the change to the request to obtain modified result data in response to the change to the request.

Audit Component and Processes

Figure 3D:
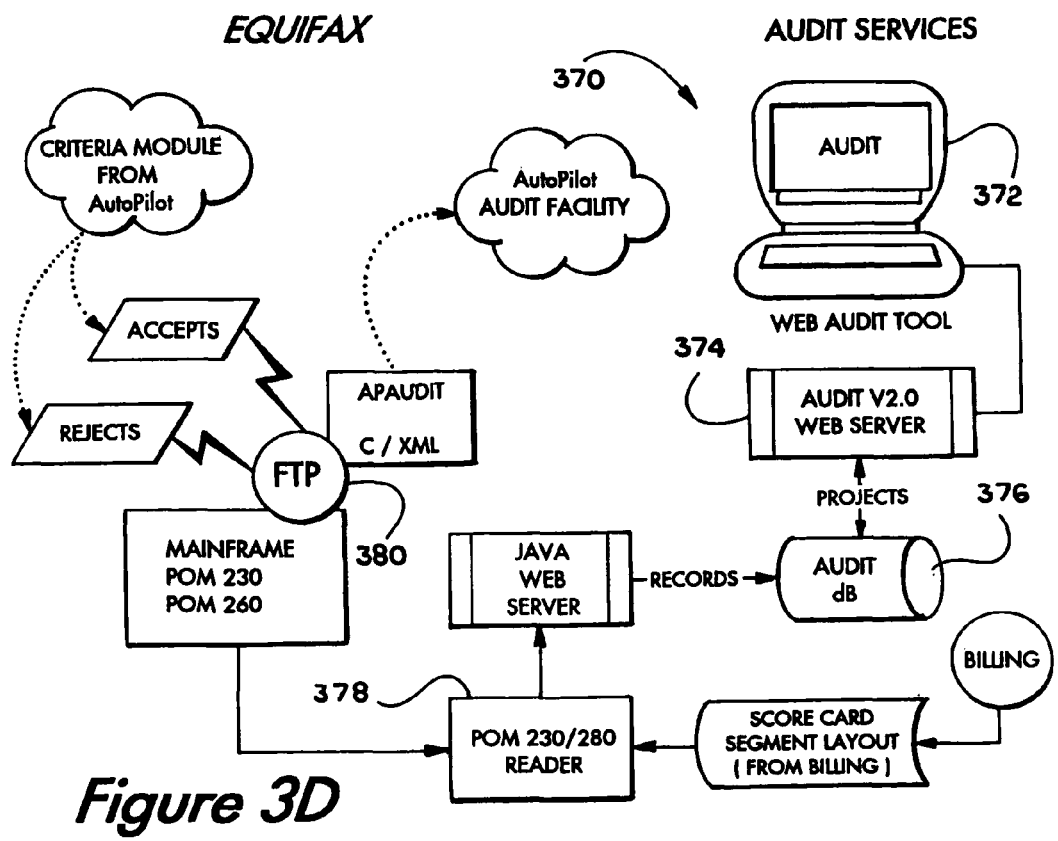
FIG. 3D illustrates an example of a process flow for an Audit component in accordance with an embodiment of the invention.

FIG. 3D is an illustration of an example process flow environment 370 for an Audit component 208 in accordance with an embodiment of the invention. In the embodiment shown in FIG. 3D, the Audit component 208 can provide a user interface for auditing result data obtained in response to a request prior to releasing the result data to a user 112a-n such as a customer. For example, the Audit component can provide a workstation environment that provides users 112a-n, such as auditors, information they need to verify relevant information associated with the result data, and to verify or discover flaws in the result data under consideration. Users 112a-n of the Audit component 208 can include, but are not limited to, credit company personnel such as production programmers, production project managers, project managers, and schedulers, as well as external customers.

In the environment 370 shown in FIG. 3D, the Audit component 306 includes a user interface 372, a server 374, an audit database 376, a data processing interface 378, and an Autopilot interface 380.

The Audit component 208 can be accessed, among other ways, as a stand-alone Internet or web application, through a graphical user interface associated with the Autopilot component 202. In one embodiment, the Audit component 208 can be an application program, software product, or service that executes directly on a client device 102a-n, such as a personal computer. In a client embodiment, the Audit component 208 can be used directly by users 112a-n such as customers. In one embodiment, the Audit component 208 can be a stand-alone network or Internet application. In any instance, the Audit component 208 can provide functionality for and share information with other components 200, 202, 204, 206 of an automated criteria and attribute application engine 120.

The Audit component 208 shown in FIGS. 2, 3, and 3D can be integrated with other components 200, 202, 204, 206 of an automated criteria and attribute application engine 120. Data processing platforms associated with the data processing component 204 can provide information via the data processing interface 378 such as result data and credit reports that can be audited by the Audit component 208, which for example, can also be accessible to users 112a-n through a plug-in network or Internet interface of the Autopilot component 202.

For example, as shown in FIG. 3D, the Audit component 208 can communicate with other platforms, such as a mainframe, supercomputer and other platforms, internal and/or external, and other components of an automated criteria and attribute application engine 120, such as the Autopilot component 202 and data processing component 204, as data is needed or stored. For example, the Audit component 208 shown in FIG. 3D can collect project requirements, project specification and details, and execution data via the data processing interface 378, and the Autopilot interface 380.

As shown in FIG. 3D, the Audit component 208 can communicate with users 112a-n via a user interface 372 such as a graphical user interface displayed on a client device 102a-n. Users 112a-n, such as external customers and internal users, can access the Audit component 208 through HTTP sessions via the audit server 374 that communicates with the client device 102a-n using a suitable language such as XML. Through the Autopilot interface 380, the Audit component 208 can support internal users of the Autopilot component 202, and can also support external users of the Autopilot component 202.

For example in the embodiment shown in FIG. 3D, a user 112a-n such as a data processing programmer or an Autopilot programmer can utilize the user interface 372 to enter a command to compile a particular project including at least one attribute and a modeling criteria. The Autopilot component 202 can runs or otherwise filter the project through a series of test files or filters, and result data or results can be stored as a set of "sample" or "test" files. These files can then be processed and downloaded to the Audit component 208 via the audit server 374. The audit server 374 can process the files as multiple files such as XML files, and save or otherwise store the multiple files to a database such as the audit database 378. A user 112a-n can then utilize the Audit component 208 to analyze the files with various tools and options provided via the user interface 372. Multiple indicators, ranges of values, calculations, and derivations of data for validating a particular set of test results can be displayed by the Audit component 208 for further analysis by a user 112a-n. Depending on the analysis of the result data or test result data by the user 112a-n, changes or modifications to criteria and/or attributes can be made via the user interface 372 or via the user interface 302 of the Autopilot component 202. Such changes or modifications to criteria and/or attributes can result in corresponding changes or modifications to a process flow, strategy, rule, or other instruction associated with the initial request or with associated executable computer code.

The user interface 372 can include features such as, but not limited to, electronically sorting credit records to identify specific information and then permit a user 112a-n to "drill down" into the information, electronically calculating derived values in real-time during an audit, quickly locating sample files electronically, performing real-time calculations on particular trade segment data, and electronically "drilling down" to raw data representations, processing entire sample sets for data anomalies and rules-based analysis, and auditing data processor generated data.

The Audit component 208 can also provide tools for auditing a project. Tools for auditing a project, can include but are not limited to, sample credit files, sample files, waterfall statistics, and multi-dimensional matrix reports. In one embodiment, the Audit component 208 can validate executable computer code associated with a project and generated for selected attributes and modeling criteria, including executable computer code for associated score models. The data processing component 204 can run or otherwise filter the project through the credit data sources 170a-n, and result data can be stored as a set of result data files. These files can then be processed and downloaded to the Audit component 208 via the audit server 374. The audit server 374 can process the files as multiple files such as XML files, and can save or otherwise store the multiple files to a database such as the audit database 376. A user 112a-n can then utilize the Audit component 208 to analyze the files with various tools and options provided via the user interface 372.

By way of example, the user interface 372 can provide a set of graphical user interface tools such as a Web audit tool to "drill down" within the information that provides business value to the user 112a in the audit process. By way of further example, the user interface 372 can provide a set of selection and search tools that can be utilized so entire sets of files can be processed for errors and data anomalies. Subsets of files can be "pulled" into the screens associated with the set of "drill down" tools for further analysis by the user 112a-n. The set of search and selection tools can also process files based on project modeling criteria.

In this manner, the Audit component 208 can validate a project from its beginning to its end, including validating detailed processing steps in between. Validation can include reconciliation of a count of every credit file as the credit file is processed throughout the project. Validation can also include generating additional matrix reports and data reports to compare with user-selected layouts and user-selected specifications.

For example, the Audit component 208 can provide users 112a-n credit data and associated analysis that can demonstrate whether the user's modeling criteria, i.e. the users' decision making, has been accurately met. In one embodiment, an indication of whether a particular set of result data is based at least on a particular criteria and/or an attribute, such as a flag or other indicator, can be displayed or otherwise provided by the Audit component 208. The Audit component 208 can generate a statistical analysis of a set of result data as the result data is created and is being further processed by other components of the automated criteria and attribute application engine 120. In this example, starting with an entire population of a particular result set, the result set can be narrowed down to specific geographical regions, and then down to specific predicted income ranges, and then down to specific credit score ranges, and then down to a specific subset of individuals who do not have specific types of derogatory public records on file, etc. The Audit component 208 can also generate multi-dimensional reports of how specific variables are used for various computations, and how criteria decisions based on those variables can be adjusted to change a set of result data ultimately delivered to a particular user 112a-n. The Audit component 208 can also generate specific credit reports of individuals to verify that the particular individual's whose information a user 112a-n is buying or selecting is accurately selected according to the modeling criteria of the user 112a-n.

In one embodiment, the Audit component 208 can support various formats of data. Since some or all data access can be abstracted, the Audit component 208 can be modified if needed to support various formats of data, including but not limited to, personal computer data, mainframe data, parallel processing platform data, supercomputer data, and custom customer data formats.

Figure 19:
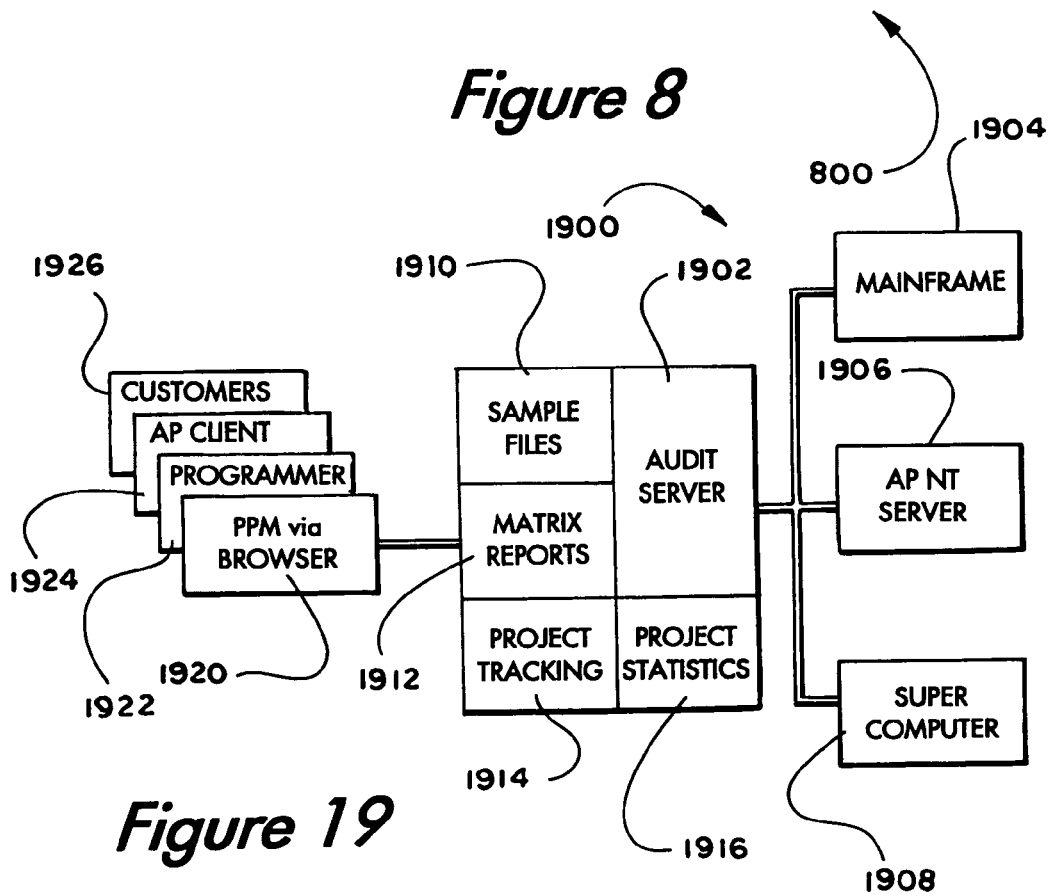
FIG. 19 is an illustration of an example process flow for an Audit component in accordance with an embodiment of the invention.

FIG. 19 illustrates another process flow environment for an Audit component 208 in communication with other platforms and components of an automated criteria and attribute application engine 120. In the example environment 1900 shown, an audit server 1902 can communicate with a mainframe 1904, an AP NT server 1906, and a supercomputer 1908. Depending on the type of platform, communications with the Audit component 208 can be formatted in FTP, HTTP, XML, a combination thereof, or another suitable language for processing by the Audit component 208. The audit server 1902 can store and process sample files 1910, matrix reports 1912, project tracking 1914, and project statistics 1916. Various information such as matrix reports 1912 that are stored on the audit server 1902 can be accessed via an Internet browser by users 112a-n such as project manager (PPM) 1920, programmer 1922, AP client 1924, and customers 1926.

In one embodiment, the Audit component 208 can include a parallel processing platform lookup engine to assist users 112a-n in analyzing and interpreting credit information. The parallel processing platform lookup engine can operate on a relatively small, isolated version of a supercomputer associated with the data processing component 204. The parallel processing platform lookup engine can provide a user 112a-n with information in an XML format which associates specific processing codes with plain English language textual descriptions. For example, a NT DLL library associated with the data processing component 204 can be accessed by the audit server 1902.

Figure 20:
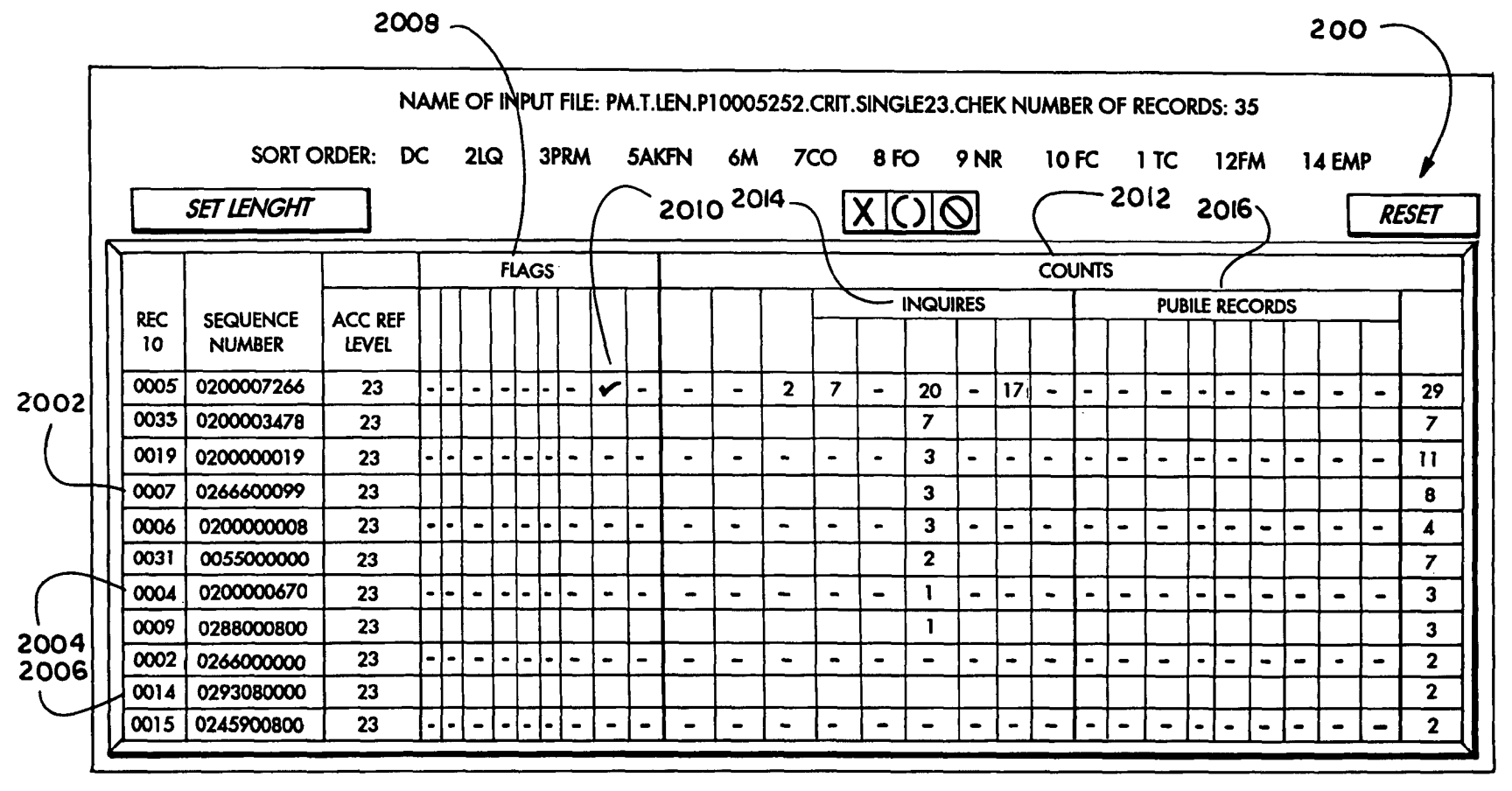

FIGS. 20-22 illustrate screenshots from a particular implementation of an Audit component according to some embodiments of systems and processes according to the present invention. FIGS. 20-22 illustrate user interfaces from various operations associated with the Audit component 208, including a sample file results page, a debt ratio calculation page, and a raw data representation page.

FIG. 20 is a screenshot of a user interface for an Audit component in accordance with an embodiment of the invention. In this screenshot, an example of a "sample file results page" is shown. As shown in FIG. 20, a graphical user interface 2000 provides various sample file results 2002, 2004, 2006 from a multilevel search on particular credit files from multiple credit data sources 170a-n. In the example shown, a particular sample file 2002 can be associated with various flags 2008 such as a "Do Not Combine" flag 2010, counts 2012 such as the specific number and type of particular inquiries 2014, and the specific number and type of particular available public records 2016 associated with the sample file 2002.

FIG. 21 is a screenshot of another user interface for an Audit component in accordance with an embodiment of the invention. In this screenshot, an example of a "debt ratio calculation page" is shown demonstrating the ability of a user 112a-n using the Audit component 208 to "drill down" within an individual credit file and perform real-time, on-line calculations to analyze the credit file. As shown in FIG. 21, a graphical user interface 2100 provides a portion of a particular credit file associated with an individual. In this example, a debt ratio 2102 such as "17.1%" is calculated for the particular credit file. When a user selects the debt ratio 2102, the Audit component 208 displays the various trade items 2104, 2106, 2108 used to calculate the debt ratio 2102 for the particular credit file. As particular trade items such as 2104, 2106 are selected by a user 112a-n, the Audit component 208 performs on-line and real-time calculations shown in the associated window 2110. In this example, calculations for the debt ratio 2112, balance 2114, counters 2116, and high credit 2118 for selected trade items is displayed.

FIG. 22 is a screenshot of another user interface for an Audit component in accordance with an embodiment of the invention. In this screenshot, an example of a "raw data representation page" is shown demonstrating the ability of a user 112a-n using the Audit component 208 to "drill down" even further within a credit file to a level of raw data representation. As shown in FIG. 22, a graphical user interface 2200 provides a portion of a particular credit file associated with an individual. In this example, a header window 2202 displays credit file identification information such as, but not limited to, length, data, project name, file identification number, file name, start position, time, and sequence number. In an associated data window 2204, raw data associated with a particular credit file can be displayed for analysis. In this manner, a user 112a-n such as a quality control person can, relatively quickly, view raw data values used in higher level calculations and scores.

Figure 23:
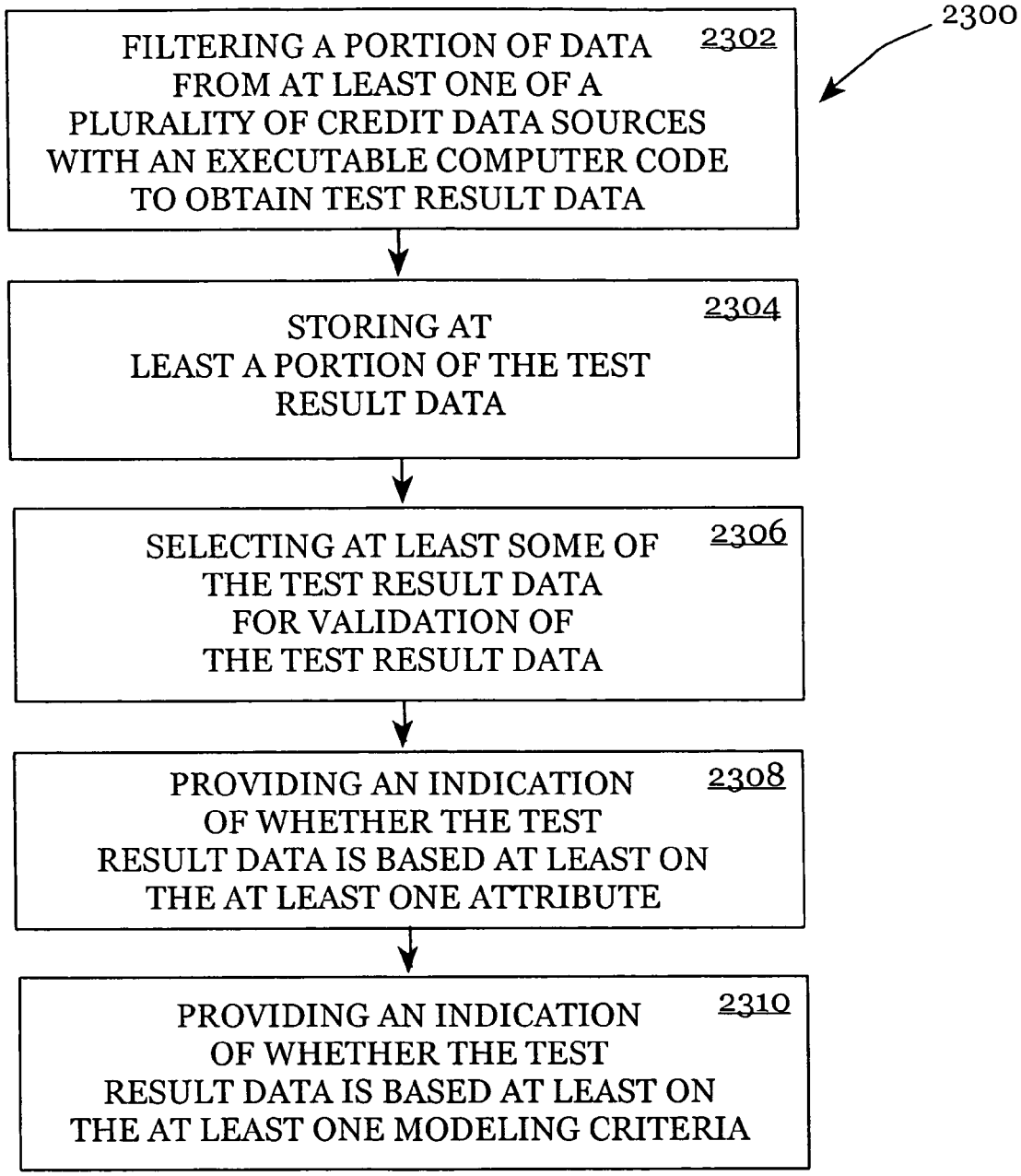
FIG. 23 is an illustration of an example method for an Audit component in accordance with an embodiment of the invention.

An example method that can be performed by an Audit component, in accordance with an embodiment of the invention, is illustrated in FIG. 23. FIG. 23 illustrates a method for auditing result data obtained from a plurality of credit data sources in response to a request based in part on at least one attribute and based in part on at least one modeling criteria.

The method 2300 begins at block 2302, in which a portion of data from at least one of a plurality of credit data sources is filtered with an executable computer code to obtain test result data.

Block 2302 is followed by block 2304, in which at least a portion of test result data is stored.

Block 2304 is followed by block 2306, in which at least some of the test result data is selected for validation of the test result data.

Block 2306 is followed by block 2308, in which an indication of whether the test result data is based at least on the at least one attribute is provided.

Block 2308 is followed by block 2310, in which an indication of whether the test result data is based at least on the at least one modeling criteria is provided.

While the above description contains many specifics, these specifics should not be construed as limitations on the scope of the invention, but merely as exemplifications of the disclosed embodiments. Those skilled in the art will envision any other possible variations that are within the scope of the invention.

The invention claimed is:

1. A computer-implemented method for providing data from a plurality of credit data sources, comprising:

providing a user interface comprising a menu representing a plurality of attribute types, each of the plurality of attribute types being selectable by a user;

configuring the user interface to display:
a name representing an attribute of at least one of the plurality of attribute types selected by the user;
a description of the attribute of the at least one of the plurality of attribute types selected by the user; and
a representation of a segment of at least one of the plurality of credit data sources, the segment being associated with the attribute of the at least one of the plurality of attribute types selected by the user;

receiving a first request at a processor-based device, the first request comprising a plurality of elements representing the at least one of the plurality of attribute types selected by the user, the segment, and a logical expression using the attribute of the at least one of the plurality of attribute types selected by the user;

automatically generating executable computer code at the processor-based device by:
translating the plurality of elements into a plurality of descriptor records, each of the plurality of descriptor records being associated with at least one of the plurality of elements;
generating a source file from the plurality of descriptor records;
compiling the source file to produce executable computer code; and
linking the executable computer code to a runtime environment component, the runtime environment component being associated with at least one of an operating platform or a processing type;

processing the executable computer code to receive result data by:
using the runtime environment component to execute the executable computer code on the plurality of credit data sources;
receiving data from the plurality of credit data sources; and
filtering the data from the plurality of credit data sources using the executable computer code to identify result data;

outputting at least a portion of the result data to the user interface;

storing the executable computer code, the runtime environment component associated with at least one of the operating platform or the processing type linked to the executable computer code, and the result data on a computer-readable memory;

receiving a second request comprising the plurality of elements at the processor-based device;

determining that the plurality of elements of the second request is the same as the plurality of elements of the first request; and outputting at least a portion of the result data associated with the first request to the user interface in response to the second request.

2. The computer-implemented method of claim 1, further comprising:
generating test executable computer code based on the plurality of elements;
selecting a set of test data from at least one of the plurality of credit data sources;
filtering the set of test data with the test executable computer code to obtain a set of test result data; and
determining whether the test result data is valid.

3. The computer-implemented method of claim 2, wherein determining whether the test result data is valid comprises determining a test model score for the test result data, wherein the test model score is based on a correlation of the plurality of elements with the test result data.

4. The computer-implemented method of claim 2, further comprising:

if the test result data is not valid, determining a modification to the first request; and modifying the test executable computer code based at least on the modification to the first request.

5. The computer-implemented method of claim 4, further comprising:

modifying the executable computer code based at least on the modification to the first request; and filtering the portion of data in the plurality of credit data sources with the modified executable computer code to obtain result data from at least one of the plurality of credit data sources in response to the modification to the first request.

6. The computer-implemented method of claim 1, further comprising:

processing the executable computer code with a data processing platform via at least one runtime component to filter the portion of data in the plurality of credit data sources.

7. The computer-implemented method of claim 1, wherein the plurality of attribute types comprise:

an aggregate attribute type;
a preprocessor attribute type;
a collector attribute type;
a value attribute type; and
an exclusion attribute type.

8. A computer-readable memory on which program code is stored, the program code being executable by a processor, the program code comprising:

program code for providing a user interface comprising a menu representing a plurality of attribute types, each of the plurality of attribute types being selectable by a user;

program code for configuring the user interface to display:
a name representing an attribute of at least one of the plurality of attribute types selected by the user;
a description of the attribute of the at least one of the plurality of attribute types selected by the user; and
a representation of a segment of at least one of a plurality of credit data sources, the segment being associated with the attribute of the at least one of the plurality of attribute types selected by the user;

program code for displaying a request on the user interface, the request comprising a plurality of elements representing the attribute of the at least one of the plurality of attribute types selected by the user, the segment, and a logical expression using the attribute of the at least one of the plurality of attribute types selected by the user, the logical expression being received from the user through the user interface;

program code for generating executable computer code by:
compiling the plurality of elements to produce the executable computer code; and
linking the executable computer code to a runtime environment component, the runtime environment component being associated with at least one of an operating platform or a processing type;

program code for processing the executable computer code to receive result data by:
using the runtime environment component to execute the executable computer code on the plurality of credit data sources;
receiving data from the plurality of credit data sources; and filtering the data from the plurality of credit data sources using the executable computer code to identify result data;

program code for outputting at least a portion of the result data to the user interface;

program code for storing the executable computer code, the runtime environment component associated with at least one of the operating platform or the processing type linked to the executable code, and the result data;

program code for receiving a second request comprising the plurality of elements;

program code for determining that the plurality of elements of the second request is the same as the plurality of elements of the first request; and program code for outputting at least a portion of the result data associated with the first request to the user interface in response to the second request.

9. The computer-readable memory of claim 8, wherein the program code further comprises:

program code for generating test executable computer code based on the plurality of elements;

program code for selecting a set of test data from at least one of the plurality of credit data sources;

program code for filtering the set of test data with the test executable computer code to obtain a set of test result data; and program code for determining whether the test result data is valid by determining a test model score for the test result data, wherein the test model score is based on a correlation of the plurality of elements with the test result data.

10. The computer-readable memory of claim 9, wherein the program code further comprises:

program code for determining a modification to the request and for modifying the test executable computer code based on the modification to the request if the test result data is not valid.

11. The computer-readable memory of claim 10, wherein the program code further comprises:

program code for modifying the executable computer code based on the modification to the request; and program code for filtering the portion of the data in the plurality of credit data sources with the modified executable computer code to obtain result data from at least one of the plurality of credit data sources in response to the modification to the request.

12. A system comprising:

a processor for executing instructions stored on a computer-readable memory to:

provide a user interface comprising a menu representing a plurality of attribute types, each of the plurality of attribute types being selectable by a user;

configure the user interface to display:
a name representing an attribute of at least one of the plurality of attribute types selected by the user;
a description of the attribute of the at least one of the plurality of attribute types selected by the user; and
a representation of a segment of at least one of a plurality of credit data sources, the segment being associated with the attribute of the at least one of the plurality of attribute types selected by the user;

receive a first request through the user interface, the first request comprising a plurality of elements representing the attribute of the at least one of the plurality of attribute types selected by the user, the segment, and a logical expression using the attribute of the at least one of the plurality of attribute types selected by the user;
automatically generate executable computer code and a runtime environment component associated with the executable computer code, the runtime environment component being associated with at least one of an operating platform or a processing type, wherein the processor is configured to execute instructions stored on a computer-readable memory to automatically generate executable computer code and the runtime environment component associated with the executable computer code by:
  translating the plurality of elements into a plurality of descriptor records, each of the plurality of descriptor records being associated with one of the plurality of elements;
  generating a source file from the plurality of descriptor records;
  compiling the source file to produce executable computer code; and
  linking the executable computer code to the runtime environment component;
process the executable computer code to receive result data by:
  using the runtime environment component associated to execute the executable computer code on the plurality of credit data sources;
  receiving data from the plurality of credit data sources; and
  filtering the data from the plurality of credit data sources using the executable computer code to identify result data;
output at least a portion of the result data to the user interface;
store the executable computer code, the runtime environment component associated with at least one of the operating platform or the processing type, and the result data on the computer-readable memory;
receive a second request comprising the plurality of elements;
determine that the plurality of elements of the second request is the same as the plurality of elements of the first request; and
output at least a portion of the result data associated with the first request to the user interface in response to the second request.

13. The system of claim 12, wherein the plurality of attribute types comprise:
  an aggregate attribute type;
  a preprocessor attribute type;
  a collector attribute type;
  a value attribute type; and
  an exclusion attribute type.

14. The system of claim 12, wherein the processor is capable of executing instructions stored on the computer-readable memory to:
  generate test executable computer code based on the plurality of elements;
  select a set of test data from at least one of the plurality of credit data sources;
  filter the set of test data with the test executable computer code to obtain a set of test result data; and
  determine whether the test result data is valid.

15. The system of claim 14, wherein the processor is capable of executing instructions stored on the compute-readable memory to determine whether the test result data is valid by determining a test model score for the test result data, wherein the test model score is based on a correlation of the plurality of elements with the test result data.

16. The system of claim 14, wherein the processor is capable of executing instructions stored on the compute-readable memory to:
  if the test result data is not valid, determine a modification to the first request; and
  modify the test executable computer code based at least on the modification to the first request.

17. The system of claim 16, wherein the processor is capable of executing instructions stored on the compute-readable memory to:
  modify the executable computer code based at least on the modification to the first request; and
  filter the portion of data in the plurality of credit data sources with the modified executable computer code to obtain result data from at least one of the plurality of credit data sources in response to the modification to the first request.

18. The system of claim 12, wherein the processor is capable of executing instructions stored on the compute-readable memory to:
  process the executable computer code with a data processing platform via at least one runtime component to filter the portion of data in the plurality of credit data sources.

* * * * *